(12) United States Patent
Matsumoto

(10) Patent No.: US 9,356,525 B2
(45) Date of Patent: May 31, 2016

(54) POWER SUPPLY DEVICE AND IMAGE FORMING APPARATUS

(71) Applicant: CANON KABUSHIKI KAISHA, Tokyo (JP)

(72) Inventor: Shinichiro Matsumoto, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 44 days.

(21) Appl. No.: 13/972,623

(22) Filed: Aug. 21, 2013

(65) Prior Publication Data

US 2014/0301114 A1     Oct. 9, 2014

(30) Foreign Application Priority Data

Aug. 31, 2012  (JP) ................................ 2012-192103
Aug. 31, 2012  (JP) ................................ 2012-192105

(51) Int. Cl.
*H02M 3/335*      (2006.01)
*G03G 15/00*      (2006.01)
*H02M 1/00*       (2006.01)
*H02M 1/36*       (2007.01)

(52) U.S. Cl.
CPC .......... *H02M 3/33523* (2013.01); *G03G 15/80* (2013.01); *H02M 3/33507* (2013.01); *H02M 1/36* (2013.01); *H02M 2001/0025* (2013.01); *H02M 2001/0032* (2013.01)

(58) Field of Classification Search
CPC .......... H02M 1/36; H02M 2001/0009; H02M 2001/0025; H02M 3/335; H02M 3/33507; H02M 3/33523; H02M 2001/0032
See application file for complete search history.

(56) References Cited

U.S. PATENT DOCUMENTS

| 5,101,252 | A | 3/1992 | Matsumoto | |
|---|---|---|---|---|
| 7,355,864 | B2 | 4/2008 | Matsumoto | |
| 7,564,695 | B2 | 7/2009 | Matsumoto | |
| 7,577,004 | B2 | 8/2009 | Matsumoto | |
| 7,595,546 | B2 | 9/2009 | Matsumoto | |
| 7,986,537 | B2 | 7/2011 | Nakamura | |
| 8,428,155 | B2 | 4/2013 | Matsumoto | |
| 2010/0208394 | A1* | 8/2010 | Lin ................................ | 361/18 |
| 2010/0321959 | A1 | 12/2010 | Matsumoto | |

(Continued)

FOREIGN PATENT DOCUMENTS

| JP | 5-328718 A | 12/1993 |
|---|---|---|
| JP | 2000-134924 A | 5/2000 |

(Continued)

*Primary Examiner* — Fred E Finch, III
(74) *Attorney, Agent, or Firm* — Fitzpatrick, Cella, Harper & Scinto

(57) ABSTRACT

The power supply device includes a transformer that includes primary, secondary and auxiliary windings; a switching unit that switches current flowing to the primary winding of the transformer; a current detection unit that detects current flowing through the primary winding, and outputs a voltage according to the current; a control unit that controls switching operation of the switching unit, according to the voltage output from the current detection unit; a first voltage detection unit that detects a voltage induced in the auxiliary winding; and a correction unit that corrects the voltage output by the current detection unit to the control unit when the voltage induced in the auxiliary winding and detected by the first voltage detection unit is higher than a first predetermined value. This configuration can reduce start-up power consumption while suppressing the vibration noise of the transformer.

12 Claims, 16 Drawing Sheets

(56) References Cited

U.S. PATENT DOCUMENTS

| | | |
|---|---|---|
| 2011/0194871 A1 | 8/2011 | Matsumoto |
| 2011/0311259 A1* | 12/2011 | Hayasaki et al. ............... 399/88 |
| 2012/0008346 A1* | 1/2012 | Kawamura ................. 363/21.15 |
| 2012/0106208 A1* | 5/2012 | Sugawara .................. 363/21.13 |
| 2013/0279134 A1 | 10/2013 | Hayashi et al. |
| 2014/0218978 A1* | 8/2014 | Heuken et al. ............. 363/21.16 |
| 2015/0023069 A1* | 1/2015 | Zhu et al. .................. 363/21.16 |

FOREIGN PATENT DOCUMENTS

| | | |
|---|---|---|
| JP | 2000-232778 A | 8/2000 |
| JP | 2003-92883 A | 3/2003 |
| JP | 2008-283742 A | 11/2008 |
| JP | 2011-10397 A | 1/2011 |
| JP | 2011-19307 A | 1/2011 |
| JP | 2012-19632 A | 1/2012 |

* cited by examiner

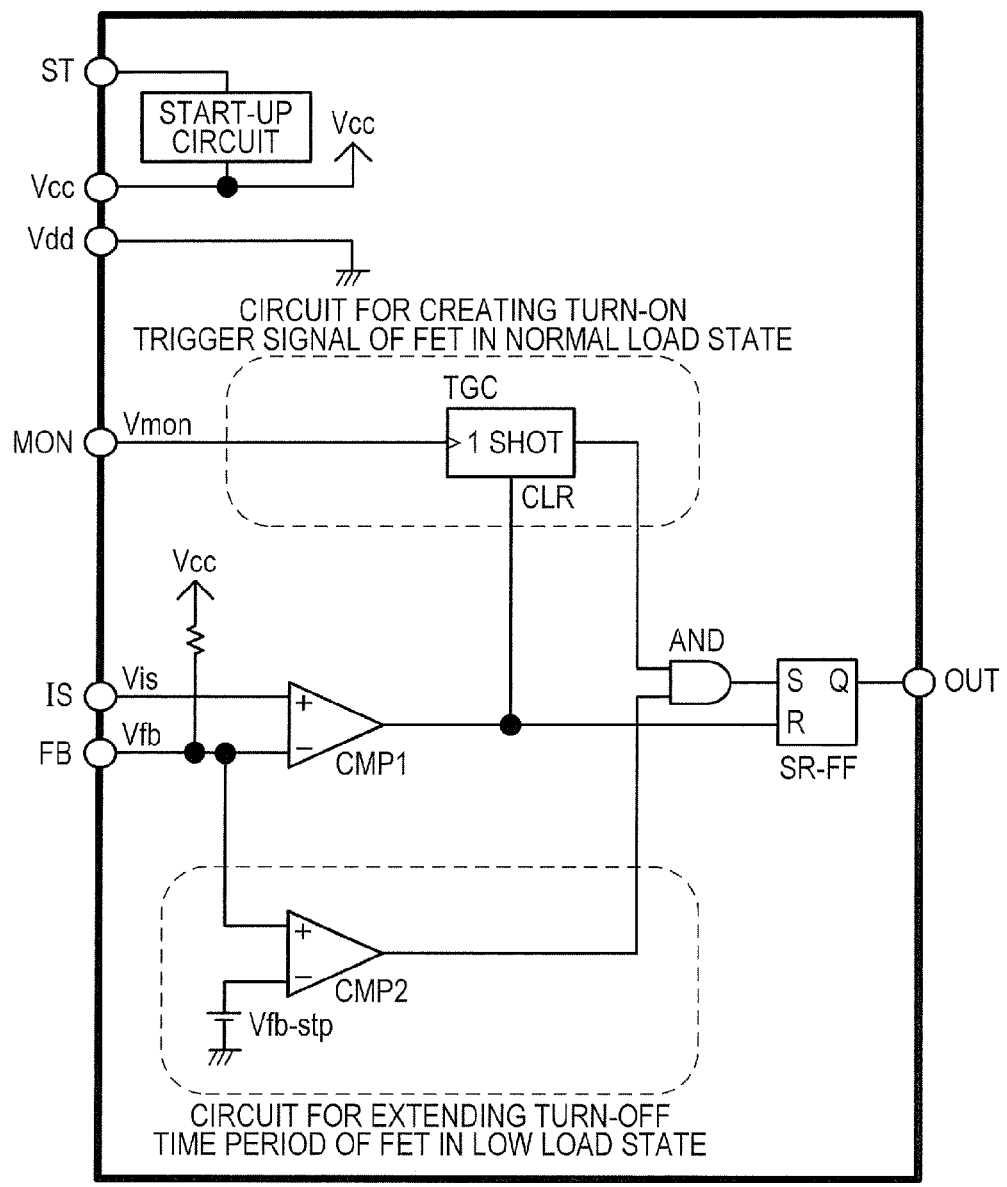

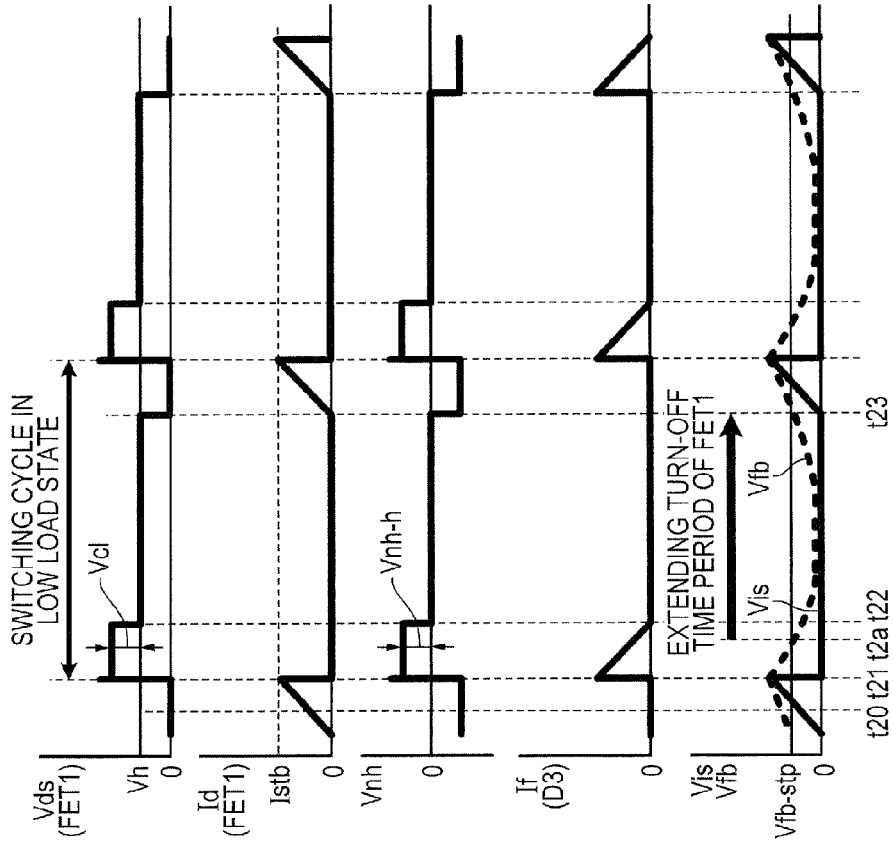
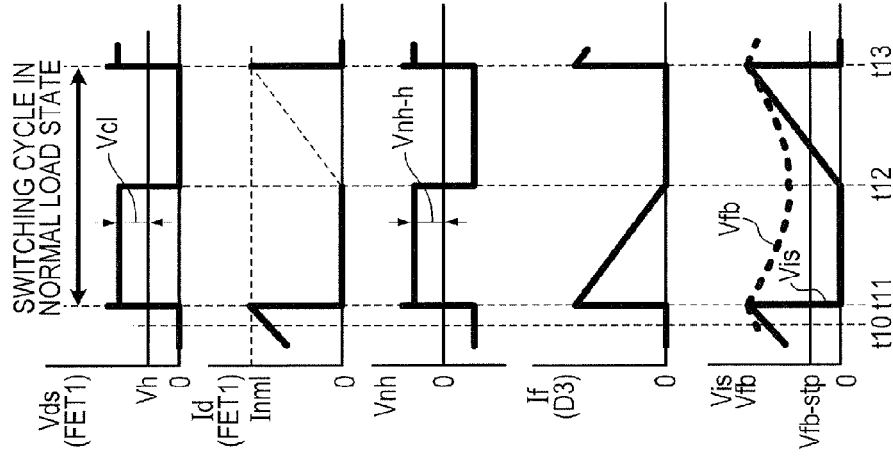
FIG. 2A (PRIOR ART)
FIG. 2B (PRIOR ART)

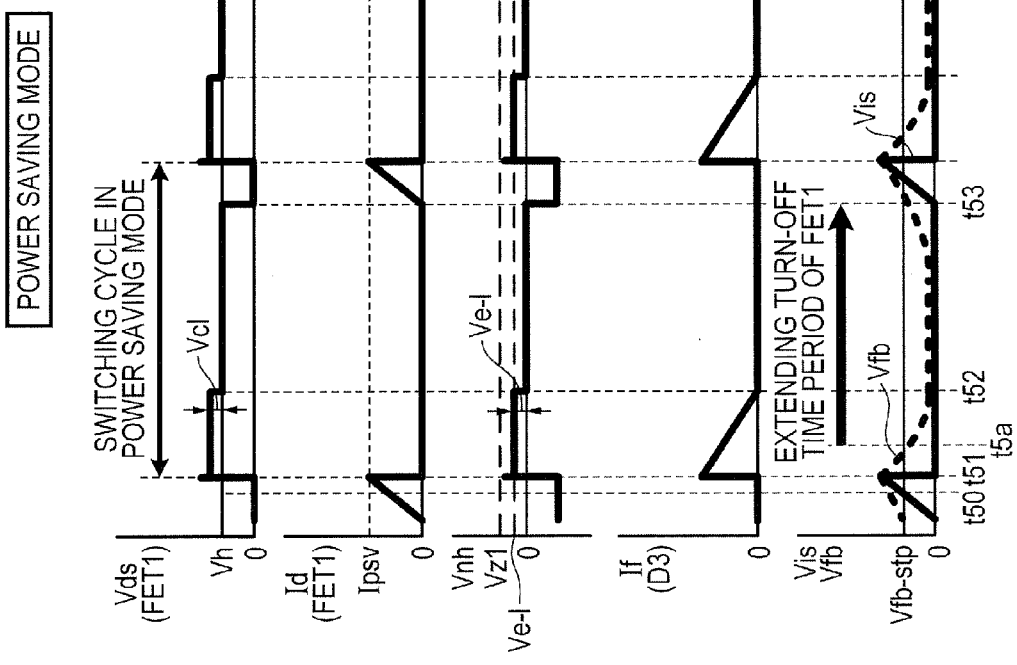
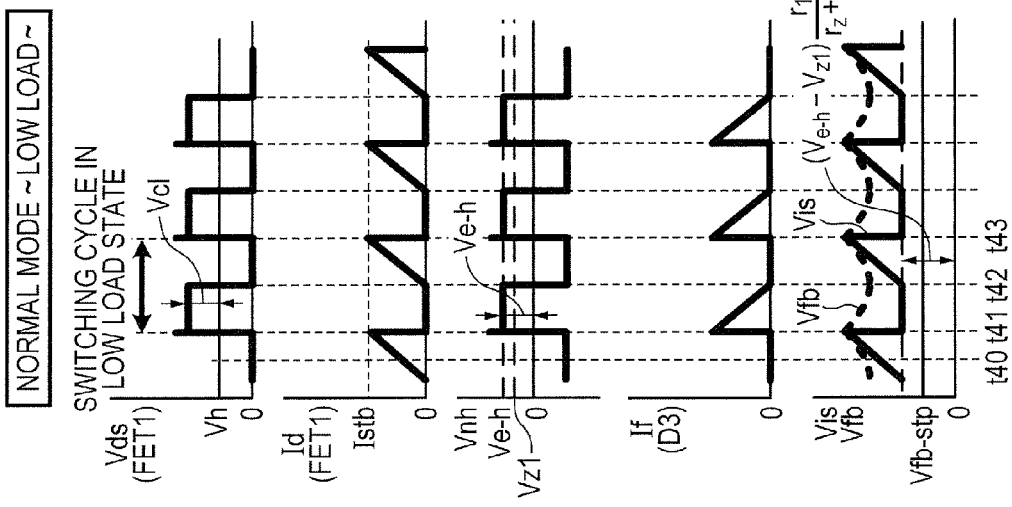

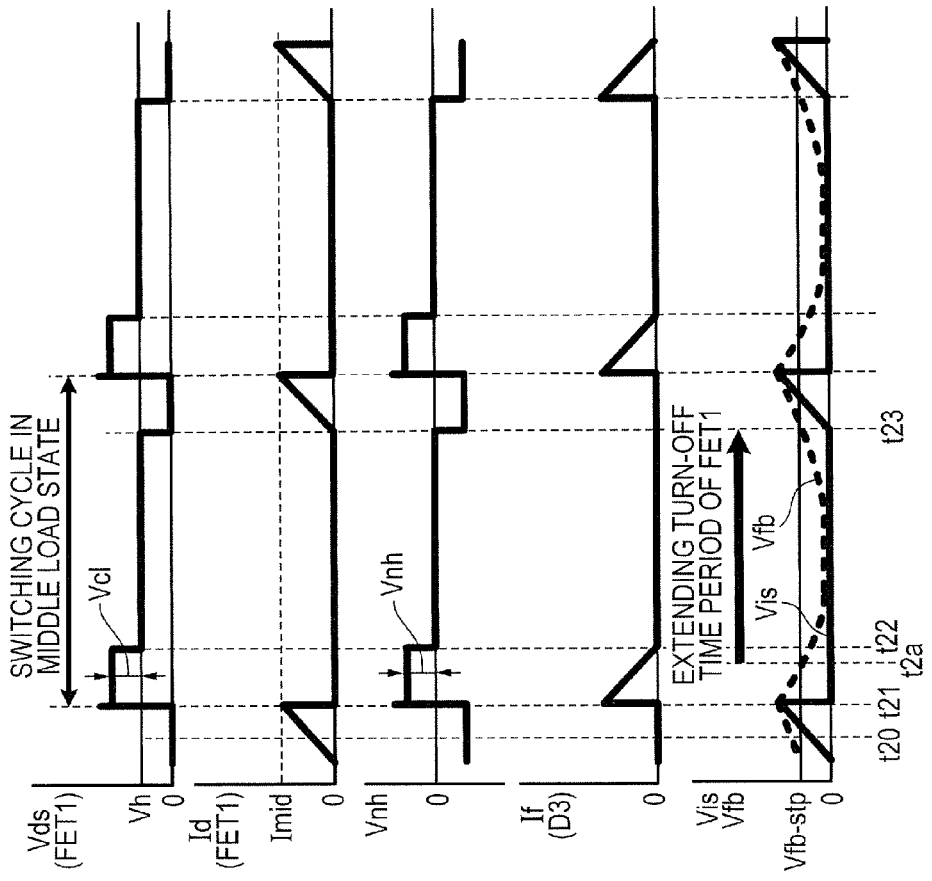
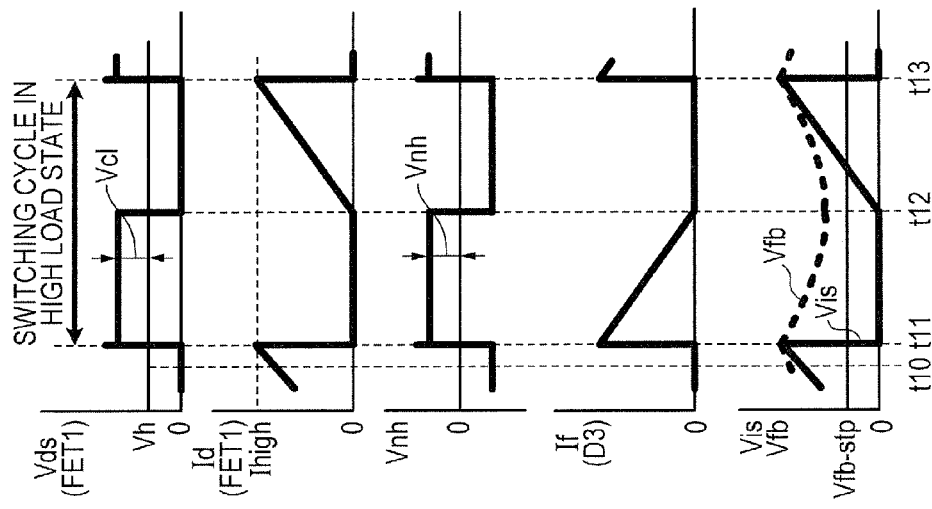

POWER SUPPLY DEVICE AND IMAGE FORMING APPARATUS

BACKGROUND OF THE INVENTION

1. Field of the Invention

The present invention relates to a switching power supply device that converts a high DC voltage acquired by rectifying and smoothing a commercial power supply into a low DC voltage required by an apparatus, and an image forming apparatus that includes the power supply device.

2. Description of the Related Art

In recent years, power conservation has been required for various electronic apparatuses. Accordingly, further power conservation has also been required for power supplies of electronic apparatuses. An example of power supplies of electronic apparatuses is a switching type power supply (hereinafter, called "switching power supply") that drives a switching element, such as an FET (field-effect transistor), at a prescribed frequency and outputs a desired voltage. Among switching power supplies, there is a certain switching power supply that reduces the number of switching operations of the switching element to improve efficiency if a load is low in a normal operation (also called "normal mode") state. Standards for power conservation have been annually revised. Not only in the normal operation state, but also in another state, further power conservation even in comparison with a low load operation has been required to further increase efficiency. Accordingly, a switching power supply outputs, for instance, DC 24 V as an output voltage in the normal mode. However, in a power saving mode for facilitating power conservation, the output voltage is, for instance, DC 3.2 V, which reduces standby power consumption.

Most of loss (power loss) in the switching power supply is caused by switching operations of the switching element that controls the output voltage of a transformer. Accordingly, reduction in the number of switching operations greatly contributes to improvement in efficiency of the switching power supply. Thus, it is often configured such that a time period of an on state of the switching element is extended to thereby increase energy of one switching operation, and intervals of the switching operations are increased accordingly to thereby reduce the number of switchings per unit time period.

For instance, Japanese Patent Application Laid-Open No. 2011-10397 discloses a power supply device for further reducing power consumption in a power conservation operation state. According to this power supply device, in a power conservation operation state where the output voltage of a transformer is set to a low voltage, control is performed according to which a switching element is turned off in response to a voltage induced in an auxiliary winding having a winding direction identical to a winding direction of a primary winding of the transformer, and the switching element is turned on based on the output voltage of the transformer.

Unfortunately, the switching power supply has the following problems. It is known that the transformer vibrates owing to exciting current flowing in an on state of the switching element to cause vibration noise. If the frequency of the vibration noise due to exciting current, that is, the switching frequency due to the switching element is in the human audible frequency band (in general, 20 Hz to 20 KHz), the vibration noise of the transformer offends human ears.

The switching frequency of the switching element is defined such that the switching frequency in a normal mode in a normal load state is fnml, the switching frequency in the normal mode in a low load state is fstb, and the switching frequency in a power saving mode is fpsv. In this case, the three switching frequencies generally have the following magnitude relationship.

$$fnml > fstb > fpsv$$

The switching frequency fstb in the normal mode in the low load state, and the switching frequency fpsv in the power saving mode are often in the human audible frequency band because the switching cycle of the switching element is long.

Furthermore, the higher the peak value of the exciting current (i.e., the drain current of FET as the switching element) flowing through the transformer is, the larger the vibration noise of the transformer is, which offends human ears. The peak value of the exciting current flowing through the transformer is defined such that the peak value of the exciting current in the normal mode in the normal load state is Inml, the peak value of the exciting current in the normal mode with the low load is Istb, and the peak value of the exciting current in the power saving mode is Ipsv. In this case, the peak values of the three exciting currents have the following magnitude relationship.

$$Inml > Istb > Ipsv$$

Thus, in the normal mode in the normal load state, the peak value of the exciting current Inml is high but the switching frequency fnml is out of the audible frequency band. Accordingly, the vibration noise of the transformer is inaudible to humans. In the normal mode in the low load state, the peak value of the exciting current Istb is high to a certain extent, and the switching frequency fstb is in the audible frequency band. Accordingly, the vibration noise of the transformer is large. On the contrary, in the power saving mode, the switching frequency fpsv is in the audible frequency band but the peak value of the exciting current Ipsv is low. Accordingly, the vibration noise of the transformer is small. Thus, the switching power supply has a problem in that the vibration noise of the transformer in the normal mode in the low load state is large.

To solve this problem, a switching power supply has been invented that is configured such that, in the normal mode and the power saving mode, the switching element always operates at the switching frequencies out of the audible frequency band (in general, 20 KHz or higher). However, such a switching power supply has a problem in that the power loss due to switching of the switching element in the power saving mode is large, which increases standby power consumption of the power supply device.

The switching frequency of the switching element is defined such that the switching frequency in the switching power supply in the high load state is fhigh, the switching frequency in the middle load state is fmid, and the switching frequency in the low load state is flow. In this case, the three switching frequencies generally have the following magnitude relationship.

$$fhigh > fmid > flow$$

The switching frequency fmid in the middle load state, and the switching frequency flow in the low load state are often in the human audible frequency band because the switching cycle of the switching element is long.

The higher the peak value of the exciting current (i.e., the drain current of FET as the switching element) flowing through the transformer is, the larger the vibration noise of the transformer is, which offends human ears. The peak value of the exciting current flowing through the transformer is defined such that the peak value of the exciting current of the switching power supply in the high load state is Ihigh, the peak value of the exciting current in the middle load state is Imid, and the peak value of the exciting current in the low load state is Ilow. In this case, the peak values of the three exciting currents generally have the following magnitude relationship.

$$Ihigh > Imid > Ilow$$

Thus, in the high load state, the peak value of the exciting current Ihigh is high but the switching frequency fhigh is out of the audible frequency band. Accordingly, the vibration noise of the transformer is inaudible to humans. In the middle load state, the peak value of the exciting current Imid is high to some extent, and the switching frequency fmid is in the audible frequency band. Accordingly, the vibration noise of the transformer is large. However, in the low load state, the switching frequency flow is in the audible frequency band but the peak value of the exciting current Ilow is low. Accordingly, the vibration noise of the transformer is small. Thus, the switching power supply has a problem in that the vibration noise of the transformer in the middle load state is large.

To solve this problem, a switching power supply has been invented that is configured such that, in any of the load states (the high load, the middle load and the low load), the switching element always operates at a switching frequency out of the audible frequency band (in general, 20 KHz or higher). However, such a switching power supply has a problem in that the power loss due to switching of the switching element in the low load state is large, which increases standby power consumption of the power supply device.

The present invention is made in such situations, and can reduce start-up power consumption while suppressing the vibration noise of the transformer.

SUMMARY OF THE INVENTION

To solve the problems, the present invention has the following configurations.

A power supply device includes a transformer that includes a primary winding, a secondary winding and an auxiliary winding having a winding direction different from a winding direction of the primary winding, a switching unit that switches current flowing to the primary winding of the transformer; a current detection unit that detects current flowing through the primary winding, and outputs a voltage according to the current, a control unit that controls switching operation of the switching unit, according to the voltage output from the current detection unit; a first voltage detection unit that detects a voltage induced in the auxiliary winding of the transformer, and a correction unit that corrects the voltage output by the current detection unit to the control unit when the voltage that is induced in the auxiliary winding and detected by the first voltage detection unit is higher than a first predetermined value.

An image forming apparatus includes an image forming unit, and a power supply that supplies power to the image forming apparatus, the power supply including a transformer that includes a primary winding, a secondary winding, and an auxiliary winding having a winding direction different from a winding direction of the primary winding; a switching unit that switches current flowing to the primary winding of the transformer; a current detection unit that detects current flowing through the primary winding, and outputs a voltage according to the current; a control unit that controls switching operation of the switching unit, according to the voltage output from the current detection unit; a first voltage detection unit that detects a voltage induced in the auxiliary winding of the transformer; and a correction unit that corrects the voltage output by the current detection unit to the control unit when the voltage that is induced in the auxiliary winding and detected by the first voltage detection unit is higher than a first predetermined value.

Further features of the present invention will become apparent from the following description of exemplary embodiments with reference to the attached drawings.

BRIEF DESCRIPTION OF THE DRAWINGS

FIG. 1B is an internal block diagram of a control module.

FIG. 2A is a diagram illustrating current and voltage waveforms of the conventional power supply device in a normal mode in a normal load state, for comparison with the embodiments.

FIG. 2B is a diagram illustrating current and voltage waveforms of the conventional power supply device in the normal mode in a low load state.

FIG. 4A is a diagram illustrating current and voltage waveforms of the power supply device of Embodiment 1 in the normal mode in the low load state.

FIG. 4B is a diagram illustrating current and voltage waveforms of the power supply device of Embodiment 1 in the power saving mode.

FIGS. 8A and 8B are diagrams illustrating current and voltage waveforms of the conventional power supply device in a high load state and a middle load state, respectively, for comparison with the embodiments.

DESCRIPTION OF THE EMBODIMENTS

Preferred embodiments of the present invention will now be described in detail in accordance with the accompanying drawings.

[Overview of Power Supply Device]

Figure 1A:
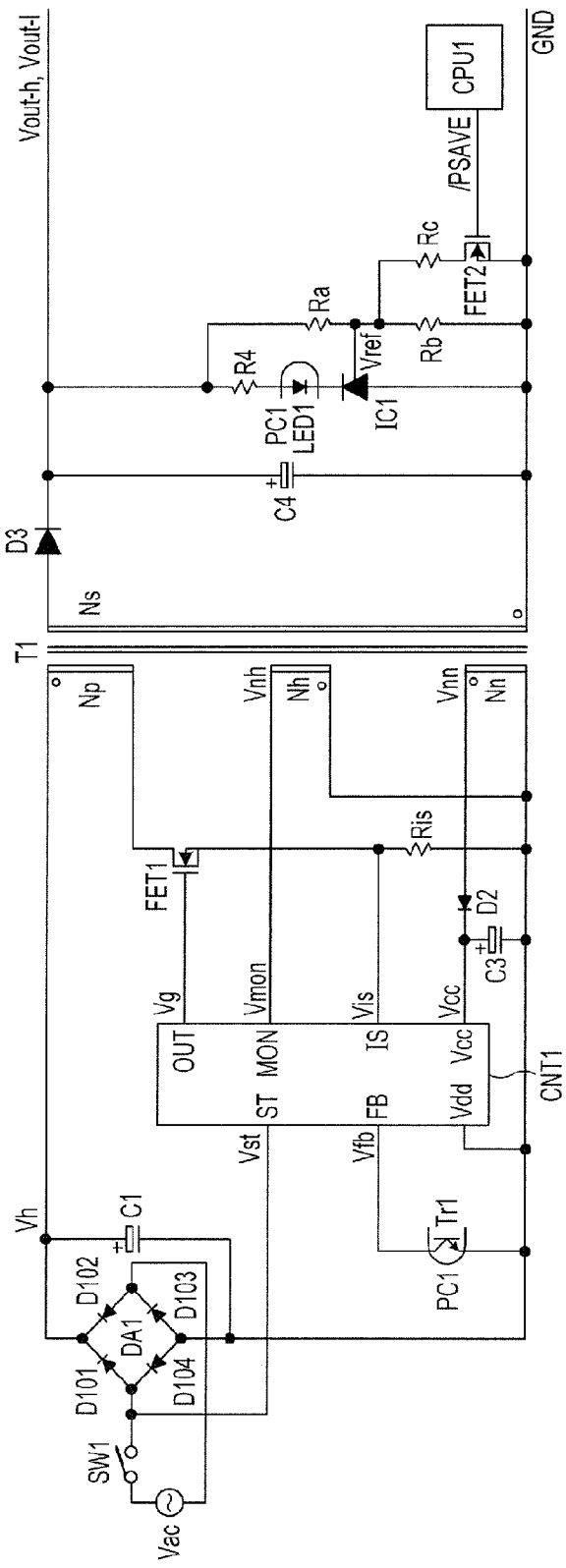
FIG. 1A is a diagram illustrating a circuit configuration of a conventional DC power supply device for comparison with embodiments.

First, for comparison with the following embodiments, a circuit configuration and operation of a conventional DC power supply device will be described using FIG. 1A. FIG. 1A illustrates a circuit of a flyback switching power supply. In FIG. 1A, when a switch SW1 is turned on, an AC voltage Vac input from a commercial AC power supply is full-wave rectified through a diode bridge DA1 including diodes D101 to D104, and smoothed by a primary electrolytic capacitor C1. The input AC voltage Vac is charged as substantially constant DC voltage Vh in the primary electrolytic capacitor C1. At the same time, to activate the control module CNT1 (hereinafter, called "control module CNT1"), a start-up terminal ST is supplied with a voltage Vst, which activates the control module CNT1. The control module CNT1 is an IC that controls turning on and off of an N-channel field-effect transistor FET 1 (hereinafter, called "FET 1") for switching operation.

In a transformer T1, not only a primary winding Np and a secondary winding Ns but also a first auxiliary winding Nh and a second auxiliary winding Nn are wound. The secondary winding Ns is configured to have a winding direction opposite to the winding direction of the primary winding Np (i.e., flyback connection). The first auxiliary winding Nh is configured to have a winding direction opposite to the winding direction of the primary winding Np (i.e., flyback connection). The second auxiliary winding Nn is configured to have a winding direction identical to the winding direction of the primary winding Np (i.e., forward connection).

The control module CNT1 has terminals Vcc, Vdd, OUT, ST, IS, FB and MON. In the Vcc terminal, which is the power supply input terminal, a voltage Vnn induced in the second auxiliary winding Nn is rectified and smoothed by a diode D2 and a capacitor C3, and the power supply voltage Vcc for driving the control module CNT1 is input. A GND (ground) potential is input into the Vdd terminal. The OUT terminal is connected to the gate terminal of the FET 1, and the on/off state of the FET 1 is controlled according to high/low level output. The ST terminal is a high voltage terminal. In the case where the input voltage to the Vcc terminal of the control module CNT1 is low, e.g., the case of startup of the power supply device, a voltage input into the ST terminal allows a required voltage to be supplied from a start-up circuit in the control module CNT1, thereby allowing the control module CNT1 to start a startup operation. The timing when the control module CNT1 turns the FET 1 from the on state to the off state is determined based on an input voltage Vis of the IS terminal and an input voltage Vfb of the FB terminal.

A shunt regulator IC1 becomes in one of conductive and non-conductive states, based on the output voltage of the transformer T1. When the shunt regulator IC1 is in the conductive state, current flows through a resistor R4 to an LED 1 of a photocoupler PC1 provided on a secondary side of the transformer T1, and the LED 1 emits light. A phototransistor Tr1 of a photocoupler PC1 on a primary side of the transformer T1 is subjected to on/off state control by the LED 1 of the photocoupler PC1. The phototransistor Tr1 of the photocoupler PC1 is connected to the FB terminal of the control module CNT1, into which a voltage proportional to the output voltage on the secondary side of the transformer T1 is input. Current flowing through the primary winding Np of the transformer T1 allows a voltage generated across the opposite ends of a current detection resistor Ris to input into the IS terminal. The control module CNT1 determines that the upper limit value of the input voltage Vis of the IS terminal is a voltage value proportional to the input voltage Vfb of the FB terminal. A voltage Vmon, which is a voltage Vnh induced in the first auxiliary winding Nh, is input into the MON terminal of the control module CNT1. The control module CNT1 detects that regeneration of the transformer T1 is finished, based on the voltage Vmon input into the MON terminal, and determines a timing when the FET 1 is changed from the off state to the on state.

[Operation of Power Supply Device in Normal Mode (in Normal Load State)]

Next, a series of operations of the power supply device will be described using FIG. 2A. FIG. 2A is a diagram illustrating current and voltage waveforms of the power supply device of FIG. 1A in the normal mode in the normal load state without power conservation operation. FIG. 2A illustrates the waveform of the voltage Vds between the drain terminal and the source terminal of the FET 1, and the waveform of the drain current Id of the FET 1. FIG. 2A further illustrates the waveform of the voltage Vnh induced in the first auxiliary winding Nh, and the waveform of current If flowing through the secondary rectification diode D3 provided on the secondary side of the transformer T1. FIG. 2A further illustrates the waveform (solid line) of input voltage Vis of the IS terminal of the control module CNT1, and the waveform (broken line) of the input voltage Vfb of the FB terminal of the control module CNT1.

In FIG. 1A, when the voltage Vst is applied to the ST terminal of the control module CNT1, the control module CNT1 outputs a signal Vg at a high level from the OUT terminal and the FET 1 is turned from an off state to an on state. When the FET 1 is turned to the on state, the drain current Id flows to the FET 1 through the primary winding Np of the transformer T1. Subsequently, the drain current Id linearly increases with a lapse of time (t10 in FIG. 2A). The drain current Id is converted by the current detection resistor Ris into the voltage Vis, which is supplied to the IS terminal of the control module CNT1 that detects current.

Meanwhile, the feedback terminal FB of the control module CNT1 is supplied with the voltage Vfb. The voltage Vfb is an error amplification signal of the output voltage of the switching power supply. The voltage Vfb decreases when the output voltage is higher than a predetermined value. The voltage Vfb increases when the output voltage is lower than the predetermined value. When the input voltage Vis into the IS terminal increases and slightly exceeds the input voltage Vfb into the FB terminal, the control module CNT1 sets the output of the OUT terminal from the high level to the low level, and the FET 1 transitions from the on state to the off state (t11, t13). When the FET 1 transitions to the off state, the drain current Id instantaneously becomes 0. Thus, the drain-source voltage Vds of the FET 1 increases to the substantially constant voltage (Vh+Vc1) (t11–t12).

In the transformer T1, not only the primary winding Np but also the secondary winding Ns and the first auxiliary winding Nh are wound. The secondary winding Ns and the first auxiliary winding Nh have winding directions different from the winding direction of the primary winding Np (i.e., "flyback-connected"). While the FET 1 is off (t11–t12), positive pulse voltages are induced in the secondary winding Ns and the first auxiliary winding Nh. The pulse voltage induced in the secondary winding Ns is rectified and smoothed by the secondary rectification diode D3 and a secondary smoothing capacitor C4 to a substantially constant output voltage Vout-h. To discriminate output voltages in the normal mode and the power saving mode from each other, a symbol "-h" is added after "output voltage Vout" in the normal mode, and a symbol "-l" is added after "output voltage Vout" in the power saving mode. Likewise, the symbols are added in the cases of the other voltages. With a definition of a forward direction drop voltage Vfd3 of the secondary rectification diode D3, the voltage Vc1 is substantially represented by the following expression using the output voltage Vout-h.

$$V_{cl} \cong (V_{out-h} + V_{fd3}) \times \frac{N_p}{N_s} \quad (1)$$

Meanwhile, the positive pulse voltage Vnh-h induced in the first auxiliary winding Nh is substantially represented by the following expression using the output voltage Vout-h.

$$V_{nh-h} \cong (V_{out-h} + V_{fd3}) \times \frac{N_h}{N_s} \quad (2)$$

The current If flowing through the secondary winding Ns linearly decreases and then reaches 0 (t12). Thereupon, the voltage Vds between the drain terminal and the source terminal of the FET 1 starts to decrease. The waveform of the voltage Vds between the drain terminal and the source terminal is analogous to the waveform of the voltage Vnh in the first auxiliary winding Nh. The voltage Vnh is input as the input voltage Vmon of the MON terminal, into the MON terminal of the control module CNT1. When the control module CNT1 detects that the voltage Vnh input into the MON terminal is at a falling edge and reaches 0 volt, this module switches the output of the OUT terminal from the low level to the high level, which resultantly switches the FET 1 from the off state to the on state. When the FET 1 transitions to the on state, the drain current Id starts to flow again in the FET 1 through the primary winding Np of the transformer T1 (t12). The operation is then repeated.

[Overview of Control Module CNT1]

The operation of the control module CNT1 will be described using FIG. 1B. FIG. 1B is a block diagram illustrating the inside of the control module CNT1, and illustrates the input and output terminals ST, Vcc, Vdd, MON, IS, FB and OUT of the control module CNT1. In FIG. 1B, the comparator CMP1 compares the voltage values of the voltage Vis input into the IS terminal and the voltage Vfb input into the FB terminal with each other. If the voltage Vis is higher, a high level is output. If the voltage Vfb is higher, a low level is output. As illustrated in FIG. 2A, in the on state of the FET 1, the voltage Vfb is higher than the voltage Vis. The output of the comparator CMP1 at this time is at the low level. As a result, the low level is input into a reset terminal (hereinafter, called "R terminal") of a set-reset flip-flop SR-FF (hereinafter, called "SR-FF") provided after the comparator CMP1. The output state therebefore (after-mentioned high level) is maintained at a Q terminal, which is an output terminal of the SR-FF. The Q terminal of the SR-FF is connected to the OUT terminal of the control module CNT1. The voltage Vg at the high level is output from the OUT terminal to the gate terminal of the FET 1, and the FET 1 maintains the on state (411, t12-t13 in FIG. 2A).

Subsequently, as the drain current Id increases, the input voltage Vis into the IS terminal increases accordingly. When the voltage Vis slightly exceeds the input voltage Vfb into the FB terminal, the output of the comparator CMP1 is switched to the high level. As a result, the high level is input into the R terminal, thereby resetting the SR-FF. The output of the Q terminal of the SR-FF is switched to the low level, the voltage Vg at the low level is output from the OUT terminal of the control module CNT1, and the FET 1 transitions to the off state (t11, t13 in FIG. 2A).

If the FET 1 transitions to the off state, the voltage induced in the secondary winding Ns of the transformer T1 is rectified and smoothed by the secondary rectification diode D3 and the secondary smoothing capacitor C4, and output as the AC output voltage Vout-h. After regeneration on the secondary side of the transformer T1 is finished, the current If flowing through the secondary winding Ns decreases, and the flow is stopped, the voltage Vnh induced in the first auxiliary winding Nh decreases to a negative voltage (t12 in FIG. 2A).

The voltage Vnh is input into the MON terminal. When an one-shot trigger circuit TGC (hereinafter, called "TGC circuit") in the control module CNT1 detects the voltage Vnh is at a falling edge and reaches 0 volt, this circuit reverses the output from the previous low level to the high level and then maintains the high level output thereafter. The output of the TGC circuit is input into one input terminal of a logical multiplication circuit AND (hereinafter, called "AND circuit"). A high level output from an after-mentioned comparator CMP2 is input into the other input terminal of the AND circuit. Accordingly, the output of the AND circuit is a high level. The output of the AND circuit is input into the set terminal (hereinafter, called "S terminal") of the SR-FF, thereby setting the SR-FF. The output of the Q terminal of the SR-FF is switched to the high level, the voltage Vg at the high level is output from the OUT terminal of the control module CNT1, and the FET 1 transitions to the on state (t12 in FIG. 2A).

Subsequently, the input voltage Vis of the IS terminal increases and slightly exceeds the input voltage Vfb of the FB terminal. The output of the comparator CMP1 is switched to the high level, and the FET 1 transitions to the off state (t13 in FIG. 2A). At this time, the output of the comparator CMP1 is input into the R terminal of the SR-FF, and also input into a CLR (clear) terminal of the TGC circuit. As a result, the TGC circuit is reset, and the output of the TGC circuit returns from the high level to the low level.

[Operation of Power Supply Device in Normal Mode (in Low Load State)]

Next, a series of operations of the power supply device in the normal mode with a low load on the secondary side of the transformer T1 will be described using FIG. 2B. FIG. 2B is a diagram illustrating current and voltage waveforms of the power supply device of FIG. 1A in the normal mode in the low load state without power conservation operation. The types of current and voltage waveforms illustrated in FIG. 2B are analogous to those in FIG. 2A.

When the FET 1 transitions to the on state, the drain current Id flows into the FET 1 through the primary winding Np of the transformer T1. Subsequently, the drain current Id linearly increases with a lapse of time (t20 in FIG. 2B). Next, when the FET 1 transitions to the off state, the drain current Id instantaneously reaches 0. Thereupon, the drain-source voltage Vds of the FET 1 increases and substantially reaches constant voltage (Vh+Vc1) (t21-t22). During decrease in the current If flowing through the secondary winding Ns, the input voltage Vfb of the FB terminal decreases (t21-). If the load on the secondary side of the transformer T1 is low, the input voltage Vfb of the FB terminal is below a switching stop voltage Vfb-stp (t2a). The output of the comparator CMP2 in the control module CNT1 illustrated in FIG. 1B becomes at the low level. The output of the comparator CMP2 is input into the AND circuit. Accordingly, during the low level output of the comparator CMP2, the output of the AND circuit is at the low level irrespective of the output level of the TGC circuit, and the Q terminal of the SR-FF maintains the previous low level output. As a result, the low level signal is output from the OUT terminal of the control module CNT1, and the FET 1 maintains the off state (t2a-t23).

As described above, when the current If flowing through the secondary rectification diode D3 becomes 0, and the voltage Vnh induced in the first auxiliary winding Nh is dropped to 0 volt, the output of the TGC circuit is switched to the high level (t22). Subsequently, the input voltage Vfb into the FB terminal gradually increases and exceeds the switching stop voltage Vfb–stp, and the comparator CMP2 outputs a high level signal (t23). As a result, the output of the AND circuit is switched from the low level to the high level, and the high level is input into the S terminal of the SR-FF, thereby setting the SR-FF. The output of the Q terminal of the SR-FF is switched to the high level, and the voltage Vg at the high level is output from the OUT terminal of the control module CNT1, and the FET 1 transitions to the on state (t23).

As described above, if the load on the switching power supply is low, the control of forcedly extending the off time period of the FET 1 (i.e., "intermittent oscillation control") is performed. This control extends the switching cycle for the FET 1 in the case of the low load in comparison with the switching cycle in the normal load state. As a result, the switching frequency fstb for the FET 1 in the low load state becomes lower than the switching frequency fnml in the normal load state. Accordingly, the power loss due to switching of the FET 1 can be reduced, and the power consumption of the apparatus can be reduced.

[Operation Mode Switching Control]

Recently, triggered by the environmental problems, further reduction in standby power consumption of electronic apparatuses has been strongly required. In the power supply device, not only the normal mode but also the power saving mode is provided. In the power saving mode, the output voltage of the transformer T1 is reduced, thereby reducing the standby power consumption. Thus, the secondary side of the transformer T1 in FIG. 1A is provided with an output voltage variable circuit that includes resistors Ra, Rb and Rc and an N-channel FET 2. A /PSAVE signal (power saving signal) is output from a CPU 1, which is a control element, to the output voltage variable circuit. The CPU 1 performs operation mode switching control between the normal mode (the /PSAVE signal is at the high level) and the power saving mode (the /PSAVE signal is at the low level) of the power supply device illustrated in FIG. 1A, using the /PSAVE signal.

When an electronic apparatus including this power supply device operates in the normal mode, the CPU 1 outputs the /PSAVE signal at the high level to the FET 2. Accordingly, the FET 2 transitions to the on state, and a voltage acquired by dividing the output voltage Vout-h on the secondary side of the transformer T1 by the resistor Ra and the parallel connected resistors Rb and Rc is input into a reference (ref) terminal of the shunt regulator IC1. Using the input voltage Vref of the reference terminal of the shunt regulator, the output voltage Vout-h in the normal mode is substantially represented by the following expression.

$$V_{out-h} \cong \frac{R_a + (R_b // R_c)}{(R_b // R_c)} \times V_{ref} \quad (3)$$

where Ra represents the resistor value of the resistor Ra in Expression (3). (Rb//Rc) is the combined resistor value (Rb and Rc are the resistor values of the respective resistors Rb and Rc) of the resistors Rb and Rc connected in parallel to each other, and represented by the following expression.

$$R_b // R_c = \frac{R_b \times R_c}{R_b + R_c} \quad (4)$$

In contrast, when the electronic apparatus including this power supply device operates in the power saving mode, the CPU 1 outputs the /PSAVE signal at the low level to the FET 2. Accordingly, the FET 2 transitions to the off state, and a voltage acquired by dividing the output voltage Vout-l on the secondary side of the transformer T1 by the resistor Ra and the resistor Rb is input into the reference (ref) terminal of the shunt regulator IC1. Thus, using the resistor values Ra and Rb of the resistors Ra and Rb and the input voltage Vref of the reference terminal of the shunt regulator, the output voltage Vout-l in the power saving mode is substantially represented by the following expression.

$$V_{out-l} \cong \frac{R_a + R_b}{R_b} \times V_{ref} \quad (5)$$

The combined resistor value in the case where the resistor Rb and the resistor Rc are connected in parallel to each other is smaller than the resister value of the resistor Rb. As a result, based on the Calculation Expression (3) for the output voltage Vout-h in the normal mode and Calculation Expression (5) for the output voltage Vout-l in the power saving mode, the output voltage Vout-l in the power saving mode is lower than the output voltage Vout-h in the normal mode.

[Operation of Power Supply Device in Power Saving Mode]

Figure 2C:
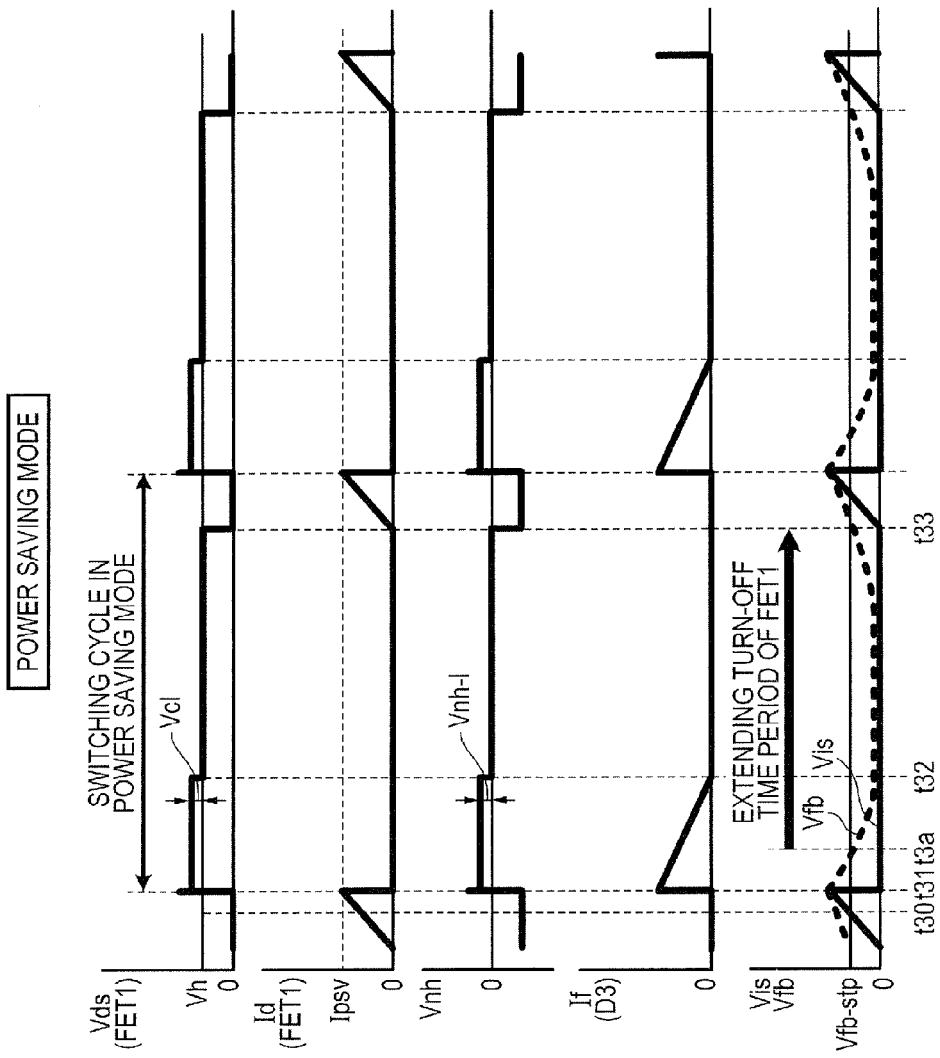
FIG. 2C is a diagram illustrating current and voltage waveforms of the conventional power supply device in a power saving mode, for comparison with the embodiments.

Next, a series of operations of the power supply device in the power saving mode will be described using FIG. 2C. FIG. 2C is a diagram illustrating current and voltage waveforms of the power supply device of the FIG. 1A in the power saving mode. The types of the current and voltage waveforms illustrated in FIG. 2C are analogous to the types in FIGS. 2A and 2B.

When the FET 1 transitions to the on state, the drain current Id flows into the FET 1 through the primary winding Np of the transformer T1. Subsequently, the drain current Id linearly increases with a lapse of time (t30 in FIG. 2C). Next, when the FET 1 transitions to the off state, the drain current Id instantaneously reaches 0. Thereupon, the drain-source voltage Vds of the FET 1 increases and substantially reaches a constant voltage (Vh+Vc1) (t31–t32). During a decreasing process in the current If flowing through the secondary winding Ns, the input voltage Vfb of the FB terminal decreases (t31–). If the load on the secondary side of the transformer T1 is low, the input voltage Vfb of the FB terminal is below the switching stop voltage Vfb–stp (t3a). As described above, the output of the comparator CMP2 in the control module CNT1 becomes at the low level. As a result, the low level signal is output from the OUT terminal of the control module CNT1, and the FET 1 maintains the off state (t3a–t33).

When the regeneration of the transformer T1 is finished, the current If flowing through the secondary rectification diode D3 reaches 0. When the voltage Vnh induced in the first auxiliary winding Nh reaches 0 volt (t32), the output of the TGC circuit of the control module CNT1 is switched to the high level. Subsequently, the input voltage Vfb of the FB terminal gradually increases. When this voltage exceeds the switching stop voltage Vfb–stp, the comparator CMP2 outputs the high level signal (t33). As a result, the high level is input into the S terminal of the SR-FF. Accordingly, the output of the Q terminal of the SR-FF is switched to the high level, the voltage Vg at the high level is output from the OUT terminal of the control module CNT1, and the FET 1 transitions to the on state (t33).

When the output voltage on the secondary side of the transformer T1 decreases from Vout-h to Vout-l in the power saving mode, the voltage Vc1 decreases in comparison with the voltage in the normal mode, as substantially represented by the following expression.

$$V_{c1} \cong (V_{out-l} + V_{fd3}) \times \frac{N_p}{N_s} \quad (6)$$

Furthermore, the positive pulse voltage Vnh-l induced in the first auxiliary winding Nh during the FET 1 being off also decreases in comparison with the voltage in the normal mode, as substantially represented by the following expression.

$$V_{nh-l} \cong (V_{out-l} + V_{fd3}) \times \frac{N_n}{N_s} \quad (7)$$

In FIG. 2C, a time period in which the FET 1 transitions to the off state and the current Id flowing through the secondary rectification diode D3 reaches 0 (t31–t32) is longer than a time period (t21–t22) in the same state in the normal mode in the low load state illustrated in FIG. 2B.

As described above, the switching cycle for the FET 1 in the power saving mode is longer than the switching cycle in the normal mode in the low load state. As a result, the switching frequency fpsv of the FET 1 in the power saving mode decreases lower than the switching frequency fstb in the normal mode in the low load state. Accordingly, the power loss of the FET 1 due to switching can be reduced, and the power consumption of the apparatus can be further reduced.

Embodiment 1

In this embodiment, a power supply device will be described that does not perform intermittent oscillation control on the switching element in the normal mode in the low load state to thereby suppress the vibration noise of the transformer.

[Overview of Power Supply Device of this Embodiment]

Figure 3:
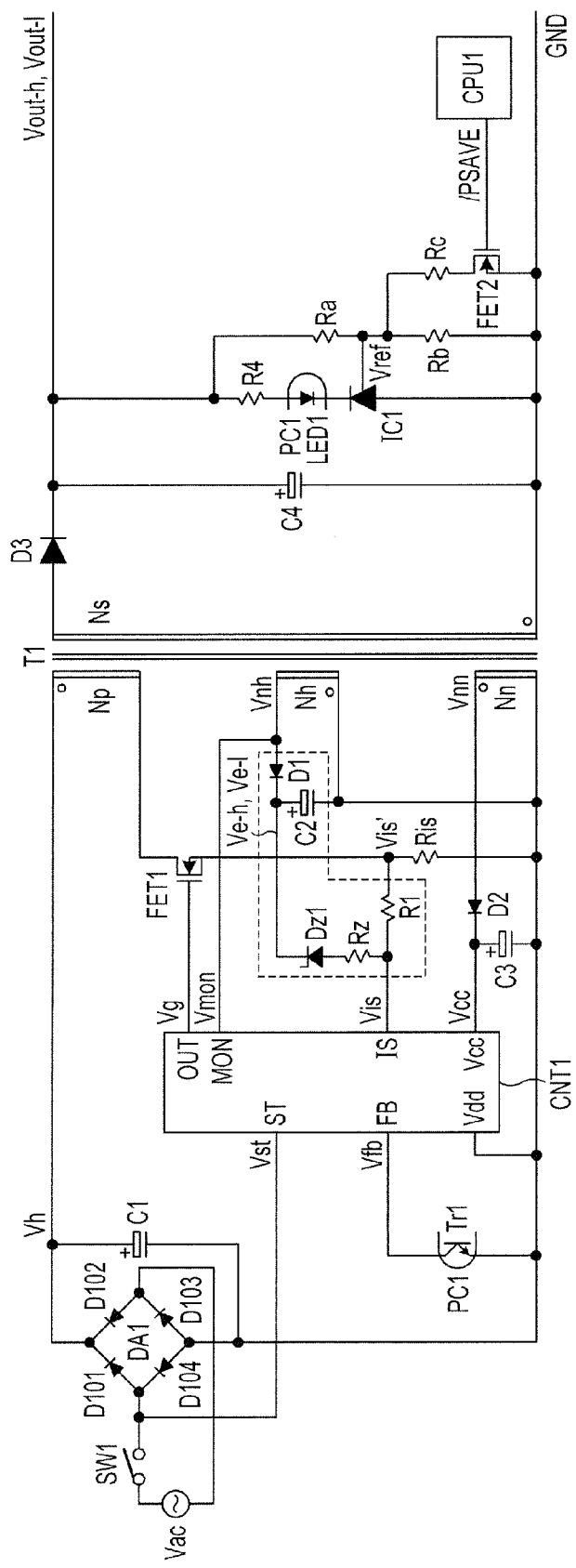
FIG. 3 is a diagram illustrating a circuit configuration of a power supply device of Embodiment 1.

FIG. 3 is a diagram illustrating a circuit configuration of a power supply device of this embodiment. In FIG. 3, a part encircled by a broken line is a part of circuitry added to the conventional power supply device illustrated in FIG. 1A. The other parts of circuitry are identical to those of FIG. 1. Accordingly, the identical symbols are assigned to the parts, on which the description is omitted.

The added part of circuitry includes a rectification circuit part, a Zener diode Dz1 (first Zener diode) as a first voltage detection unit, and a resistor voltage dividing circuit part. The rectification circuit part includes a diode D1 and a capacitor C2 that rectify and smooth the positive voltage amplitude value of the pulse voltage Vnh induced in the first auxiliary winding Nh of the power supply device illustrated in FIG. 1A. If a DC voltage Ve rectified and smoothed by the rectification circuit part is higher than a prescribed voltage (first predetermined value), the Zener diode Dz1 allows current to flow. If the voltage is lower, the state becomes a high impedance state, which prevents current from flowing. The resistor voltage dividing circuit part includes resistors Rz and R1. If the DC voltage Ve is higher than a prescribed voltage, an input voltage into the IS terminal is corrected such that a voltage higher than a voltage occurring across the opposite ends of the current detection resistor Ris is input into the IS terminal of the control module CNT1.

[Operation of Power Supply Device in Normal Mode (in Low Load State)]

Referring to FIG. 4A, operation of the power supply device of this embodiment in the normal mode in the low load state will be described. FIG. 4A is a diagram illustrating current and voltage waveforms of the power supply device of FIG. 3 in the normal mode in the low load state without power conservation operation. The types of the current and voltage waveforms illustrated in FIG. 4A are analogous to the types of the current and voltage waveforms in the normal mode in the low load state illustrated in FIG. 2B in the power supply device illustrated in FIG. 1A.

In the power supply device of FIG. 3, the voltage Vnh induced in the first auxiliary winding Nh is rectified and smoothed by the diode D1 and the capacitor C2 into a substantially constant DC voltage Ve-h. When the forward direction voltage drop of the diode D1 is 0, the voltage Ve-h is substantially identical to the voltage Vnh-h induced in the first auxiliary winding Nh. This voltage is substantially represented by the above-described Expression (2). The voltage Ve-h is supplied to the Zener diode Dz1.

$$V_{e-h} \cong V_{nh-h} \cong (V_{out-h} + V_{fd3}) \times \frac{N_h}{N_s} \quad (8)$$

As a Zener voltage Vz1 of the Zener diode Dz1 of this embodiment, a Zener voltage is selected that satisfies the following expression on the voltage Ve-h induced in the first auxiliary winding in the normal mode and a voltage Ve-l induced in the first auxiliary winding in an after-mentioned power saving mode.

$$Ve\text{-}h > Vz1 > Ve\text{-}l \quad (9)$$

Accordingly, a voltage represented by the following expression is applied to a resistor Rz connected to an anode side of the Zener diode Dz1.

$$V_{e-h} - V_{z1} \cong V_{nh-h} - V_{z1} \cong (V_{out-h} + V_{fd3}) \times \frac{N_h}{N_s} - V_{z1} \quad (10)$$

Here, the Zener voltage Vz1 and the resistor values of the resistors Rz and R1 are set such that the voltage Vis generated by dividing a voltage (Ve-h−Vz1) applied to the resistor Rz, by the resistor Rz and the resistor R1, is sufficiently higher than a voltage Vis' generated across the opposite ends of the current detection resistor Ris.

The voltage Vis input into the IS terminal, which is a current detection terminal of the control module CNT1, is substantially represented by the following expression.

$$V_{is} \cong (V_{e-h} - V_{z1}) \times \frac{r_1}{r_z + r_1} + V'_{is} \cong \\ \left\{ (V_{out-h} + V_{fd3}) \times \frac{N_h}{N_s} - V_{z1} \right\} \times \frac{r_1}{r_z + r_1} + V'_{is} \quad (11)$$

That is, the voltage Vis input into the IS terminal is a voltage acquired by shifting (increasing), in the positive direction, the voltage Vis' generated across the opposite ends of the current detection resistor Ris by a voltage acquired by dividing the voltage (Ve-h−Vz1) applied to the resistor Rz by, the resistor Rz and the resistor R1. The Zener voltage Vz1 and the resistor values of the resistors Rz and R1 are set such that the voltage Vis input into the IS terminal is higher than the switching stop voltage Vfb−stp.

In the conventional power supply device, in the normal mode with a low load, during the input voltage Vfb into the FB terminal being lower than the switching stop voltage Vfb−stp, "intermittent oscillation control" is performed that forcedly extends the time period of the off state of the FET 1. However, as illustrated in FIG. 4A, in this embodiment, the input voltage Vis into the IS terminal and the input voltage Vfb into the FB terminal are always higher than the switching stop voltage Vfb−stp, and the "intermittent oscillation control" is not performed. As a result, the switching frequency of the FET 1 is not in an audible range, and the vibration noise of the transformer T1 is suppressed.

[Operation of Power Supply Device in Power Saving Mode]

Subsequently, referring to FIG. 4B, operation of the power supply device of this embodiment in the power saving mode will be described. FIG. 4B is a diagram illustrating current and voltage waveforms of the power supply device of FIG. 3 performing power conservation operation in the power saving mode. The types of the current and voltage waveforms illustrated in FIG. 4B are analogous to those in FIG. 4A illustrating the current and voltage waveforms of the power supply device of FIG. 3 in the normal mode in the low load state. In FIG. 4B, the voltage Vnh induced in the first auxiliary winding Nh is rectified and smoothed by the diode D1 and the capacitor C2 into the substantially constant DC voltage Ve-l. If the forward direction voltage drop of the diode D1 is 0, the voltage Ve-l is substantially identical to the voltage Vnh-l induced in the first auxiliary winding Nh-l, and substantially represented by the following expression based on the above-described Expression (7). The voltage Ve-l is supplied to the Zener diode Dz1.

$$V_{e\text{-}l} \cong V_{nh\text{-}l} \cong (V_{out\text{-}l} + V_{fd3}) \times \frac{N_n}{N_s} \quad (12)$$

Based on the above-described Expression (9), the Zener voltage Vz1 of the Zener diode Dz1 is set to a voltage higher than the voltage Ve-l (voltage) value. Accordingly, the Zener diode Dz1 is in the high impedance state. As a result, no current flows through the correction resistor Rz. Accordingly, the input voltage Vis into the IS terminal has a voltage value substantially identical to the value of the voltage Vis' generated across the opposite ends of the current detection resistor Ris. That is, in the power saving mode, the correction resistors Rz and R1 do not affect the input voltage Vis into the IS terminal. Accordingly, as described above, the switching frequency fpsv of the FET 1 in the power saving mode sufficiently decreases, which can reduce the power loss due to switching of the FET 1 and, in turn, reduce the power consumption of the apparatus.

As described above, in the normal mode with a low load, this embodiment can reduce standby power consumption while suppressing the vibration noise of the transformer. In the normal mode with a low load, the vibration noise of the transformer can be reduced by setting the switching frequency out of the audible frequency band. Furthermore, in the power saving mode, the switching frequency is reduced, which can reduce the power loss due to switching of the switching element and, in turn, reduce the power consumption of the apparatus.

Embodiment 2

In Embodiment 1, the circuit configuration has been described that, even in the normal mode with a low load, the voltage Vis' is corrected such that the input voltage Vis of the IS terminal and the input voltage Vfb of the FB terminal of the control module CNT1 are higher than the switching stop voltage Vfb−stp. However, according to the circuit configuration described in Embodiment 1, only if in the normal mode, the voltage is corrected not only in the case with a low load but also in the normal load state. Accordingly, the switching frequency sometimes increases more than necessary to increase the power loss due to switching of the switching element. Thus, in this embodiment, a circuit configuration will be described below that suppresses increase in switching frequency in the normal mode in the normal load state.

[Overview of Power Supply Device of this Embodiment]

Figure 5:
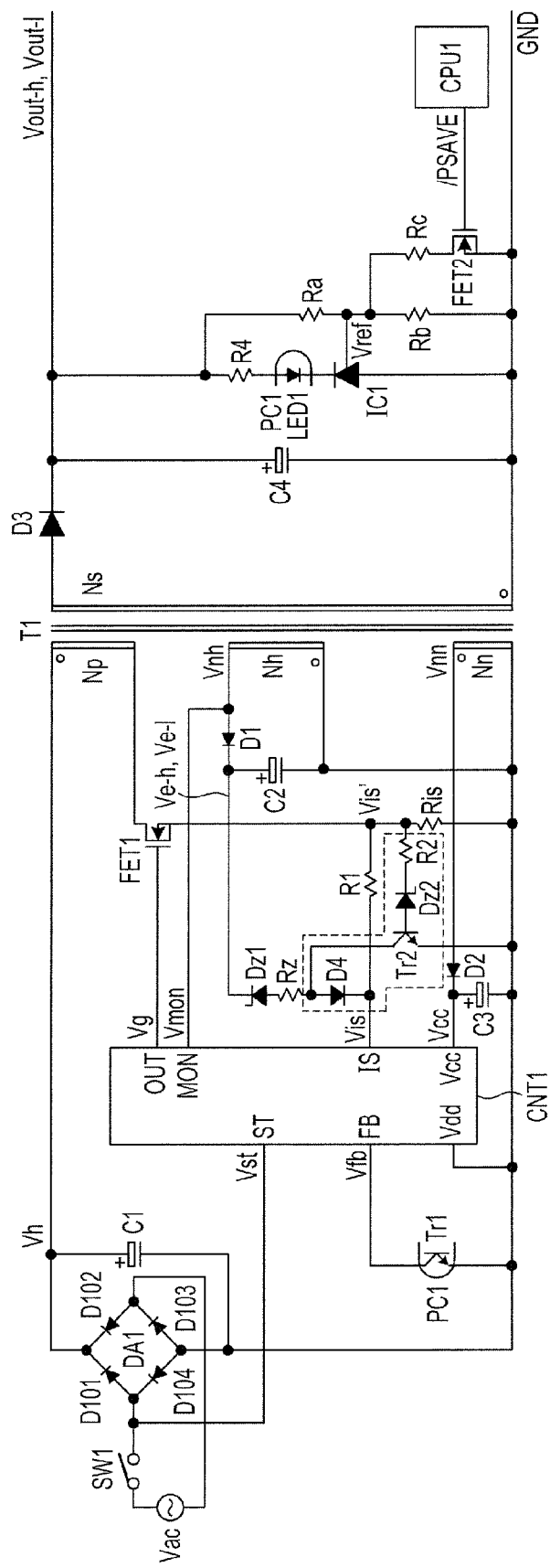
FIG. 5 is a diagram illustrating a circuit configuration of a power supply device of Embodiment 2.

FIG. 5 is a diagram illustrating a circuit configuration of a power supply device of this embodiment. In FIG. 5, a part encircled by a broken line is a part of circuitry added to the power supply device illustrated in FIG. 3 of Embodiment 1. The other parts of circuitry are identical to those of FIG. 3. Accordingly, the identical symbols are assigned to the parts, on which the description is omitted. The added part of circuitry includes a Zener diode Dz2 as a second voltage detection unit, a resistor R2, a diode D4, and a transistor Tr2. In the low load state, the resistor voltage dividing circuit described in Embodiment 1 operates. In the normal load state, the resistor voltage dividing circuit does not operate. That is, if the voltage generated across the opposite ends of the current detection resistor Ris is higher than the Zener voltage (second predetermined value) of the Zener diode Dz2, the transistor Tr2 is in the on state, the diode D4 is in the non-conductive state, and the resistor voltage dividing circuit does not function (does not operate). In contrast, if the voltage generated across the opposite ends of the current detection resistor Ris is lower than the Zener voltage of the Zener diode Dz2, the transistor Tr2 is in the off state, the diode D4 is in the conductive state, and the resistor voltage dividing circuit functions (operates).

[Operation of Power Supply Device in Normal Mode (in Low Load State)]

To simplify the description in this embodiment, it is defined that the forward direction voltage drop Vfd4 of the diode D4 and the base-emitter voltage Vbe of the transistor Tr2 are set to 0. The Zener voltage Vz2 of the Zener diode Dz2 (second Zener diode) is a threshold voltage for setting the transistor Tr2 to the on state. In this embodiment, as the Zener voltage Vz2, a voltage value is selected that is higher than the voltage Vis' generated across the opposite ends of the current detection resistor Ris in the normal mode in the low load state but lower than the voltage Vis' in the normal mode in the normal load state. Accordingly, in the normal mode in the low load state, the Zener diode Dz2 is in the non-conductive state, and the transistor Tr2 is in the off state. As a result, the diode D4 is in the conductive state, the voltage Vis corrected by the resistor voltage dividing circuit including the resistors Rz and R1 is input into the IS terminal. Meanwhile, in the normal mode in the normal load state, the Zener diode Dz2 is in the conductive state, the transistor Tr2 is in the on state, and the input voltage on the anode side of the diode D4 is substantially 0 volt. When the voltage Vis' across the opposite ends of the current detection resistor Ris increases, the diode D4 is reverse biased, the resistor voltage dividing circuit including the resistors Rz and R1 does not operate, and the voltage Vis' across the opposite ends of the current detection resistor Ris is input as the input voltage Vis of the IS terminal. Accordingly, in the normal mode in the normal load state, increase in the switching frequency of the FET 1 can be suppressed.

As described above, in the normal mode with the low load, this embodiment can reduce standby power consumption while suppressing the vibration noise of the transformer. In the normal mode with a low load, the vibration noise of the transformer can be reduced by setting the switching frequency out of the audible frequency band. Furthermore, in the normal mode in the normal load state, the switching frequency does not increase more than necessary. Accordingly, switching of the switching element does not increase the power loss.

Embodiment 3

In Embodiment 2, the description has been made where the forward direction voltage drop of the diode and the base-emitter voltage of the transistor is 0 volt. However, in an actual circuit, these voltages may affect the voltage correction operation in the circuit. Thus, in this embodiment, a circuit configuration will be described that is in consideration of the forward direction voltage drop of the diode and the base-emitter voltage of the transistor.

Figure 6:
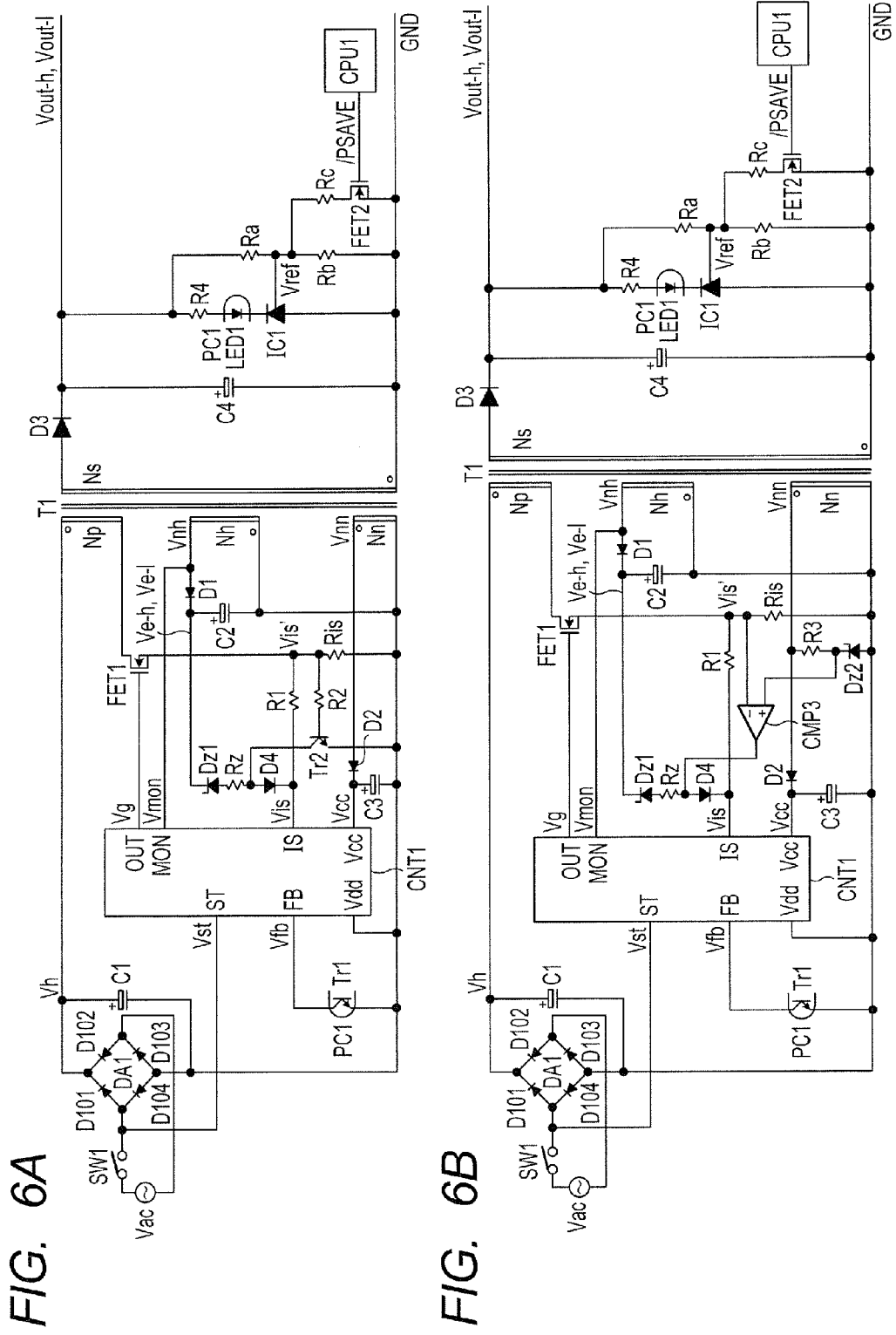
FIGS. 6A and 6B are diagrams illustrating circuit configurations of power supply devices of Embodiment 3.

FIG. 6A is a circuit configuration in consideration of the base-emitter voltage of the transistor. In comparison with FIG. 5 of Embodiment 2, the Zener diode Dz2 connected to the base terminal of the transistor Tr2 is omitted. The other parts of circuitry are analogous to those in FIG. 5. Accordingly, the same symbols are assigned thereto, and the description thereof is omitted. In Embodiment 2, the description has been made where the base-emitter voltage Vbe of the transistor Tr2 is 0 volt. Instead, in this embodiment, as illustrated in FIG. 6A, the base-emitter voltage Vbe (typically 0.6 to 0.7 V) of the transistor Tr2 is used as a threshold voltage for setting the transistor Tr2 to the on state. Accordingly, even with the configuration without the Zener diode Dz2, advantageous effects equivalent to those of Embodiment 2 can be exerted. Furthermore, the Zener diode Dz2, which is necessary in Embodiment 2, can be omitted, which can reduce the cost.

In Embodiment 2, the description has been made where the forward direction voltage drop Vfd4 of the diode D4 and the base-emitter voltage Vbe of the transistor Tr2 are 0 volt. However, in an actual circuit, the forward direction voltage drop Vfd4 and the base-emitter voltage Vbe may affect correction operation of the circuit. Thus, FIG. 6B is a circuit diagram illustrating a circuit configuration where the transistor Tr2 in the circuit in FIG. 5 in Embodiment 2 is replaced with a circuit including a comparator CMP3. The other parts of circuitry are analogous to those in FIG. 3. Accordingly, the same symbols are assigned, and the description thereof is omitted.

In FIG. 6B, the voltage Vis' generated across the opposite ends of the current detection resistor Ris is input into a reverse input terminal (−) of the comparator CMP3. Meanwhile, a cathode side of the Zener diode Dz2 (third Zener diode) is connected to a non-reverse input terminal (+), where the Zener voltage Vz2 is applied. In the case where the voltage Vis', which is an input voltage into the reverse input terminal (−), is lower than the Zener voltage Vz2 applied to the non-reverse input terminal (+), i.e., in the normal mode in the low load state, the output of the comparator CMP3 is in the high impedance state. As a result, the diode D4 is in the conductive state, a voltage corrected by the resistor voltage dividing circuit including the resistors Rz and R1 is input into the input voltage Vis of the IS terminal. In contrast, in the case where the voltage Vis', which is the input voltage into the reverse input terminal (−), is higher than the Zener voltage Vz2 applied to the non-reverse input terminal (+), i.e., in the normal mode in the normal load state, current flowing through the Zener diode Dz1 and the resistor Rz flows into the comparator CMP3. As a result, the input voltage on the anode side of the diode D4 substantially reaches 0 volt, the resistor voltage dividing circuit including the resistors Rz and R1 does not operate, the voltage Vis' across the opposite ends of the current detection resistor Ris is input as the input voltage Vis of the IS terminal. As illustrated in FIG. 6B, adoption of the comparator CMP3 instead of the transistor Tr2 can prevent the base-emitter voltage Vbe of the transistor Tr2 from affecting correction operation by the resistor voltage dividing circuit.

As described above, in the normal mode with a low load, this embodiment can reduce standby power consumption while suppressing the vibration noise of the transformer. In the normal mode with a low load, the vibration noise of the transformer can be reduced by setting the switching frequency out of the audible frequency band. Furthermore, the circuit element (Zener diode) is omitted, thereby allowing the cost to be reduced. Moreover, adoption of the comparator instead of the transistor can facilitate stabilization of circuit operation.

Embodiment 4

The power supply devices described in Embodiments 1 to 3 can be applied as, for instance, a low voltage power supply for an image forming apparatus, i.e., a power supply that supplies power to a controller (control unit) and a driver, such as a motor. A configuration of an image forming apparatus to which any of the power supply devices of Embodiments 1 to 3 is applied will hereinafter be described.

[Configuration of Image Forming Apparatus]

Figure 7:
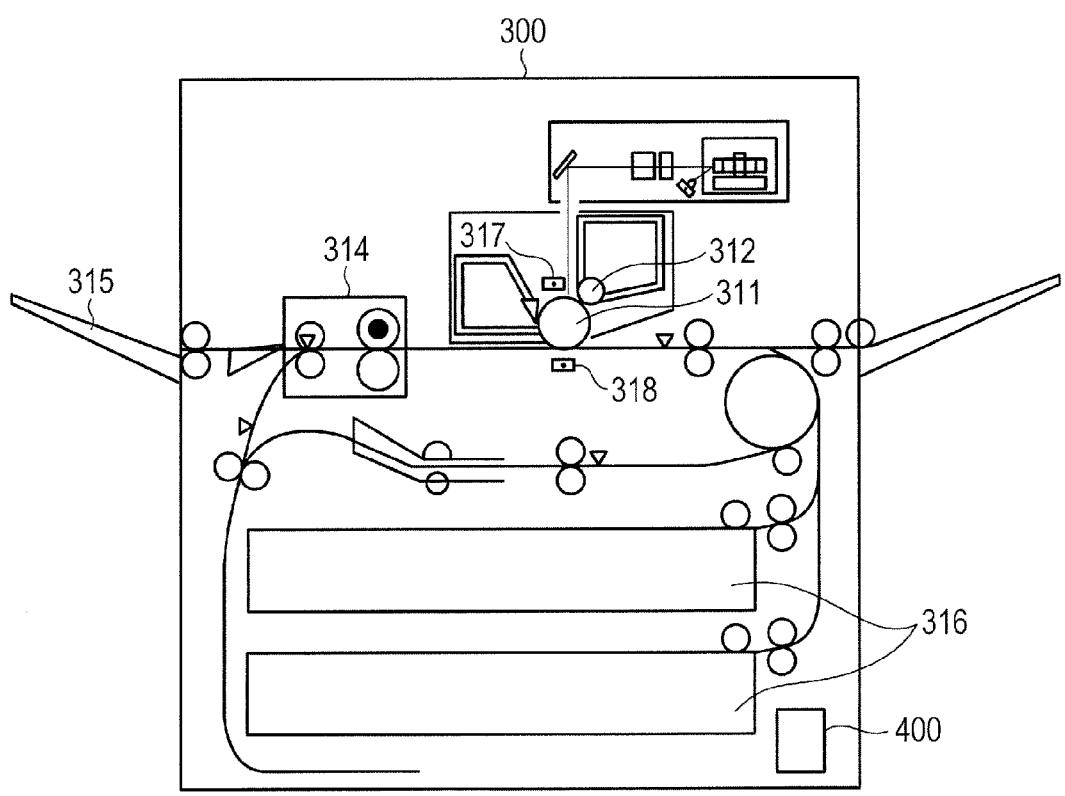
FIG. 7 is a diagram illustrating a schematic configuration of a laser beam printer of Embodiments 4 and 8.

Description will be made where a laser beam printer is exemplified as an image forming apparatus. FIG. 7 illustrates a schematic configuration of a laser beam printer, which is one example of an electrophotographic printer. The laser beam printer 300 includes: a photosensitive drum 311 as an image carrier on which an electrostatic latent image is formed; a charging unit 317 (charging section) that uniformly charges the photosensitive drum 311; and a developing unit 312 (developing section) that develops the electrostatic latent image formed on the photosensitive drum 311 with a toner. The toner image developed on the photosensitive drum 311 is transferred by a transfer unit 318 (transfer section) onto a sheet (not illustrated), which is a recording medium supplied from a cassette 316. The toner image transferred on the sheet is fixed by the fixing unit 314 and ejected onto a tray 315. The photosensitive drum 311, the charging unit 317, the developing unit 312 and the transfer unit 318 configure an image forming unit. The laser beam printer 300 further includes the power supply device 400 described in Embodiments 1 to 3. The image forming apparatus to which any of the power supply devices in Embodiments 1 to 3 is applicable is not limited to the apparatus illustrated in FIG. 7 as an example. Instead, an image forming apparatus may be adopted that includes, for instance, a plurality of image forming units. Furthermore, an image forming apparatus may be adopted that includes a primary transfer unit for transferring a toner image on the photosensitive drum 311 onto an intermediate transfer belt, and a secondary transfer unit for transferring the toner image on the intermediate transfer belt onto a sheet.

The laser beam printer 300 further includes a controller, not illustrated, which controls image forming operation by the image forming unit and sheet transfer operation. The power supply device 400 described in each of Embodiments 1 to 3 supplies power to, for instance, the controller. Furthermore, the power supply devices 400 described in each of Embodiments 1 to 3 supplies power to drivers, such as motors, for rotating the photosensitive drum 311 and driving various rollers for transferring a sheet. In the standby state (e.g., in the power saving mode) for achieving power conservation, the image forming apparatus of this embodiment reduce the load, for instance, supplies power only to the controller, thereby allowing the power consumption to be reduced. That is, according to the image forming apparatus of this embodiment, in the power saving mode, the power supply device 400 described in each of Embodiments 1 to 3 performs intermittent oscillation operation. When the image forming apparatus operates in the normal mode with a low load, the configuration described in each of Embodiments 1 to 3 increases the switching frequency of the power supply device 400 to set vibration noise occurring from the transformer T1 out of the audible frequency band. Accordingly, the vibration noise of the transformer is suppressed so as to be inaudible to humans, and the power consumption of the power supply device 400 is reduced.

As described above, in the normal mode with a low load, this embodiment can reduce standby power consumption while suppressing the vibration noise of the transformer.

Next, Embodiments 5 to 8 will hereinafter be described. In the Embodiments 5 to 8, the load conditions are different from those of the above described embodiments.

[Operation of Power Supply Device in High Load State]

Next, a series of operations of the power supply device will be described using FIG. 8A. FIG. 8A is a diagram illustrating current and voltage waveforms of the power supply device of FIG. 1A in the high load state. FIG. 8A illustrates the waveform of the voltage Vds between the drain terminal and the source terminal of the FET 1, and the waveform of drain current Id of the FET 1. FIG. 8A also illustrates the waveform of the voltage Vnh induced in the first auxiliary winding Nh, and the waveform of current If flowing through the secondary rectification diode D3 provided on the secondary side of the transformer T1. FIG. 8A further illustrates the waveform (solid line) of input voltage Vis of the IS terminal of the control module CNT1 and the waveform (broken line) of the input voltage Vfb of the FB terminal.

In FIG. 1A, when the voltage Vst is applied to the ST terminal of the control module CNT1, the control module CNT1 outputs the signal Vg at the high level from the OUT terminal, and switches the FET 1 from the off state to the on state. When the FET 1 transitions to the on state, the drain current Id flows into the FET 1 through the primary winding Np of the transformer T1. Subsequently, the drain current Id linearly increases with a lapse of time (t10 in FIG. 8A). The drain current Id is converted by the current detection resistor Ris into the voltage Vis, and supplied to the IS terminal that detects current in the control module CNT1.

Meanwhile, the feedback terminal FB of the control module CNT1 is supplied with the voltage Vfb. The voltage Vfb is the error amplitude signal of the output voltage Vout of the switching power supply. If the output voltage Vout is higher than the predetermined value, the voltage Vfb decreases. If the output voltage Vout is lower than the predetermined value, the voltage Vfb increases. When the input voltage Vis into the IS terminal increases and slightly exceeds the input voltage Vfb into the FB terminal, the control module CNT1 switches the output Vg of the OUT terminal from the high level to the low level, and the FET 1 transitions from the on state to the off state (t11, t13). When the FET 1 transitions to the off state, the drain current Id instantaneously reaches 0. Thereupon, the drain-source voltage Vds of the FET 1 increases to a substantially constant voltage (Vh+Vc1) (t11–t12).

In the transformer T1, not only the primary winding Np but also the secondary winding Ns and the first auxiliary winding Nh are wound. The secondary winding Ns and the first auxiliary winding Nh are configured to have a winding direction different from the winding direction of the primary winding Np (i.e., "flyback-connected"). While the FET 1 is off (t11–t12), positive pulse voltages are induced in the secondary winding Ns and the first auxiliary winding Nh. The pulse voltage induced in the secondary winding Ns is rectified and smoothed by the secondary rectification diode D3 and the secondary smoothing capacitor C4 into the substantially constant output voltage Vout. With the forward direction drop voltage Vfd3 of the secondary rectification diode D3, the voltage Vc1 is represented by the following expression using the output voltage Vout.

$$V_{c1} \cong (V_{out} + V_{fd3}) \times \frac{N_p}{N_s} \qquad (1)$$

Meanwhile, the positive pulse voltage Vnh induced in the first auxiliary winding Nh is substantially represented by the following expression using the output voltage Vout.

$$V_{nh} \cong (V_{out} + V_{fd3}) \times \frac{N_h}{N_s} \qquad (2)$$

The current If flowing through the secondary winding Ns linearly decreases and then reaches 0 (t12). Thereupon, the voltage Vds between the drain terminal and the source terminal of the FET 1 starts to decrease. The waveform of the voltage Vds between the drain terminal and the source terminal is similar to the waveform of the voltage Vnh in the first auxiliary winding Nh. The voltage Vnh is input as the input voltage Vmon of the MON terminal of the control module CNT1, into this MON terminal. When the control module CNT1 detects that the voltage Vnh input into the MON terminal is at a falling edge and 0 volt, this module switches the output Vg of the OUT terminal from the low level to the high level. As a result, the FET 1 transitions from the off state to the on state. When the FET 1 transitions to the on state, the drain current Id starts to flow again into the FET 1 through the primary winding Np of the transformer T1 (t12). Subsequently, the operation is repeated.

[Overview of Control Module CNT1]

The operation of the control module CNT1 will be described using FIG. 1B. FIG. 1B is a block diagram illustrating the inside of the control module CNT1, and illustrates the input and output terminals ST, Vcc, Vdd, MON, IS, FB and OUT of the control module CNT1. In FIG. 1B, the comparator CMP1 compares the voltage values of the voltage Vis input into the IS terminal and the voltage Vfb input into the FB terminal with each other. If the voltage Vis is higher, a high level is output. If the voltage Vfb is higher, a low level is output. As illustrated in FIG. 8A, in the on state of the FET 1, the voltage Vfb is higher than the voltage Vis. The output of the comparator CMP1 at this time is at the low level. As a result, the low level is input into a reset terminal (hereinafter, called "R terminal") of a set-reset flip-flop SR-FF (hereinafter, called "SR-FF") provided after comparator CMP1. The previous output state (after-mentioned high level) is maintained at a Q terminal, which is an output terminal of the SR-FF. The Q terminal of the SR-FF is connected to the OUT terminal of the control module CNT1. The voltage Vg at the high level is output from the OUT terminal to the gate terminal of the FET 1, and the FET 1 maintains the on state (411, t12–t13 in FIG. 8A).

Subsequently, as the drain current Id increases, the input voltage Vis into the IS terminal increases accordingly. When the voltage Vis slightly exceeds the input voltage Vfb into the FB terminal, the output of the comparator CMP1 is switched to the high level. As a result, the high level is input into the R terminal, thereby resetting the SR-FF. The output of the Q terminal of the SR-FF is switched to the low level, the voltage Vg at the low level is output from the OUT terminal of the control module CNT1, and the FET 1 transitions to the off state (t11, t13 in FIG. 8A).

If the FET 1 transitions to the off state, the voltage induced in the secondary winding Ns of the transformer T1 is rectified and smoothed by the secondary rectification diode D3 and the secondary smoothing capacitor C4, and output as the DC output voltage Vout. After regeneration on the secondary side of the transformer T1 is finished, the current If flowing through the secondary winding Ns decreases, and the flow is stopped, the voltage Vnh induced in the first auxiliary winding Nh decreases and becomes a negative voltage (t12 in FIG. 8A).

The voltage Vmon is input into the MON terminal. When an one-shot trigger circuit TGC (hereinafter, called "TGC circuit") in the control module CNT1 detects that the voltage Vmon is at a falling edge and reaches 0 volt, this circuit reverses the output from the previous low level to the high level and then maintains the high level output thereafter. The output of the TGC circuit is input into one input terminal of a logical multiplication circuit AND (hereinafter, called "AND circuit"). A high level output from an after-mentioned comparator CMP2 is input into the other input terminal of the AND circuit. Accordingly, the output of the AND circuit is a high level. The output of the AND circuit is input into the set terminal (hereinafter, called "S terminal") of the SR-FF, thereby setting the SR-FF. The output of the Q terminal of the SR-FF is switched to the high level, the voltage Vg at the high level is output from the OUT terminal of the control module CNT1, and the FET 1 transitions to the on state (t12 in FIG. 8A).

Subsequently, after the input voltage Vis of the IS terminal increases and slightly exceeds the input voltage Vfb of the FB terminal, and the output of the comparator CMP1 is switched to the high level, the FET 1 transitions to the off state (t13 in FIG. 8A). At this time, the output of the comparator CMP1 is input into the R terminal of the SR-FF, and also input into the CLR (clear) terminal of the TGC circuit. As a result, the TGC circuit is reset, and the output of the TGC circuit returns from the high level to the low level.

[Operation of Power Supply Device in Middle Load State]

Next, a series of operations of the power supply device in the middle load state will be described using FIG. 8B. FIG. 8B is a diagram illustrating current and voltage waveforms of the power supply device of FIG. 1A in the middle load state. The types of current and voltage waveforms illustrated in FIG. 8B are analogous to those in FIG. 8A.

When the FET 1 transitions to the on state, the drain current Id flows into the FET 1 through the primary winding Np of the transformer T1. Subsequently, the drain current Id linearly increases with a lapse of time (t20 in FIG. 8B). Next, when the FET 1 becomes in the off state, the drain current Id instantaneously reaches 0. Thereupon, the drain-source voltage Vds of the FET 1 increases and substantially reaches constant voltage (Vh+Vc1) (t21–t22). During decrease in the current If flowing through the secondary winding Ns, the input voltage Vfb of the FB terminal decreases (t21–). If the load on the secondary side of the transformer T1 is a middle load, the input voltage Vfb of the FB terminal is below a switching stop voltage Vfb–stp (t2a). Thereupon, the output of the comparator CMP2 in the control module CNT1 illustrated in FIG. 1B is at the low level. The output of the comparator CMP2 is input into the AND circuit. Accordingly, during the low level output of the comparator CMP2, the output of the AND circuit is at the low level irrespective of the output level of the TGC circuit, and the Q terminal of the SR-FF maintains the previous low level output. As a result, the low level signal is output from the OUT terminal of the control module CNT1, and the FET 1 maintains the off state (t2a–t23).

As described above, when the current If flowing through the secondary rectification diode D3 becomes 0, and the voltage Vnh induced in the first auxiliary winding Nh is dropped to 0 volt, the output of the TGC circuit is switched to the high level (t22). Subsequently, the input voltage Vfb of the FB terminal gradually increases and exceeds the switching stop voltage Vfb–stp, and the comparator CMP2 outputs a high level signal (t23). As a result, the output of the AND circuit is switched from the low level to the high level, and the high level is input into the S terminal of the SR-FF, thereby setting the SR-FF. The output of the Q terminal of the SR-FF is switched to the high level, and the voltage Vg at the high level is output from the OUT terminal of the control module CNT1, and the FET 1 transitions to the on state (t23).

As described above, if the load on the switching power supply is the middle load, the control of forcedly extending the off time period of the FET 1 (i.e., "intermittent oscillation control") is performed. This control extends the switching cycle for the FET 1 in the case of the middle load in comparison with the switching cycle in the high load state. The switching frequency of the FET 1 is within the audible frequency band. As a result, the switching frequency of the FET 1 fmid in the middle load state is reduced in comparison with the switching frequency fhigh in the high load state. This reduction can reduce the power loss due to switching of the FET 1 and, in turn, reduce the power consumption of the apparatus.

[Operation of Power Supply Device in Low Load State]

Figure 8C:
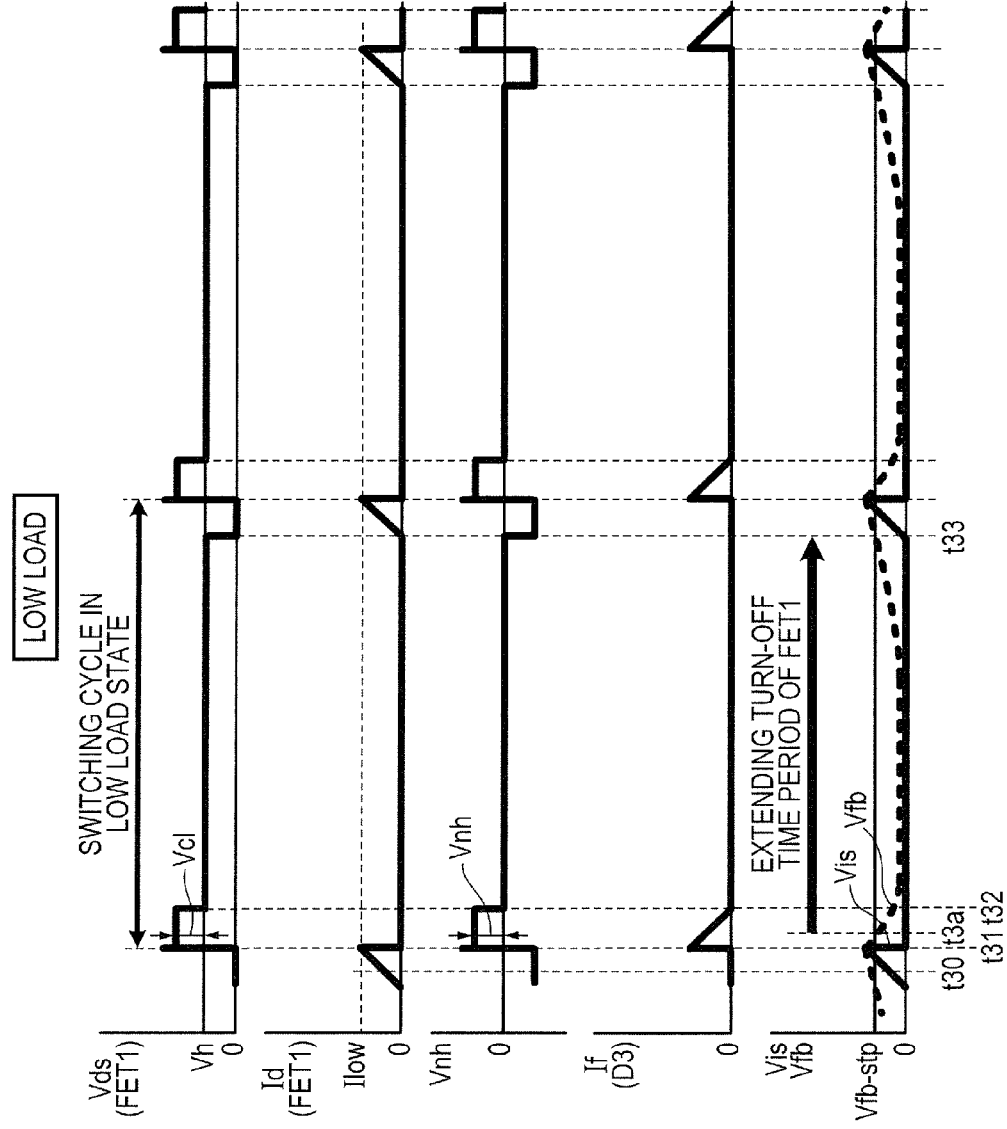
FIG. 8C is a diagram illustrating current and voltage waveforms of the conventional power supply device in the low load state, for comparison with the embodiments.

Recently, triggered by environmental problems, further reduction in standby power consumption of electronic apparatuses has been strongly required. The standby power consumption of the electronic apparatus corresponds to the power consumption of the power supply device in the low load state. Next, a series of operations of the power supply device in the low load state will be described using FIG. 8C. FIG. 8C is a diagram illustrating current and voltage waveforms of the power supply device of the FIG. 1A in the low load state. The types of the current and voltage waveforms illustrated in FIG. 8C are analogous to the types in FIGS. 8A and 8B.

When the FET 1 transitions to the on state, the drain current Id flows into the FET 1 through the primary winding Np of the transformer T1. Subsequently, the drain current Id linearly increases with a lapse of time (t30 in FIG. 8C). Next, when the FET 1 becomes in the off state, the drain current Id instantaneously reaches 0. Thereupon, the drain-source voltage Vds of the FET 1 increases and reaches the substantially constant voltage (Vh+Vc1) (t31–t32). During decrease in the current If flowing through the secondary winding Ns, the input voltage Vfb of the FB terminal decreases (t31–). If the load on the secondary side of the transformer T1 is low, the input voltage Vfb of the FB terminal is below the switching stop voltage Vfb-stp (t3a). As described above, the output of the comparator CMP2 in the control module CNT1 is at the low level. As a result, the low level signal Vg is output from the OUT terminal of the control module CNT1, and the FET 1 maintains the off state (t3a–t33).

When the regeneration of the transformer T1 is finished, the current If flowing through the secondary rectification diode D3 reaches 0. When the voltage Vnh induced in the first auxiliary winding Nh reaches 0 volt (t32), the output of the TGC circuit of the control module CNT1 is switched to the high level. Subsequently, the input voltage Vfb of the FB terminal gradually increases. When this voltage exceeds the switching stop voltage Vfb-stp, the comparator CMP2 outputs the high level signal (t33). As a result, the high level is input into the S terminal of the SR-FF. Accordingly, the output of the Q terminal of the SR-FF is switched to the high level, the voltage Vg at the high level is output from the OUT terminal of the control module CNT1, and the FET 1 transitions to the on state (t33). The time period (t31–t32) in which the FET 1 transitions to the off state and the current Id flowing through the secondary rectification diode D3 reaches 0 in FIG. 8C is longer than the time period (t21–t22) in the same situations in the middle load state illustrated in FIG. 8B.

As described above, the switching cycle for the FET 1 in the low load state is longer than the switching cycle in the middle load state. As a result, the switching frequency flow of the FET 1 in the low load state is reduced in comparison with the switching frequency fmid in the middle load state. This reduction can reduce the power loss due to switching of the FET 1 and, in turn, further reduce the power consumption of the apparatus.

Embodiment 5

In this embodiment, a power supply device that does not perform the intermittent oscillation control of the switching element in the middle load state to thereby suppress the vibration noise of the transformer.

[Overview of Power Supply Device of this Embodiment]

Figure 9:
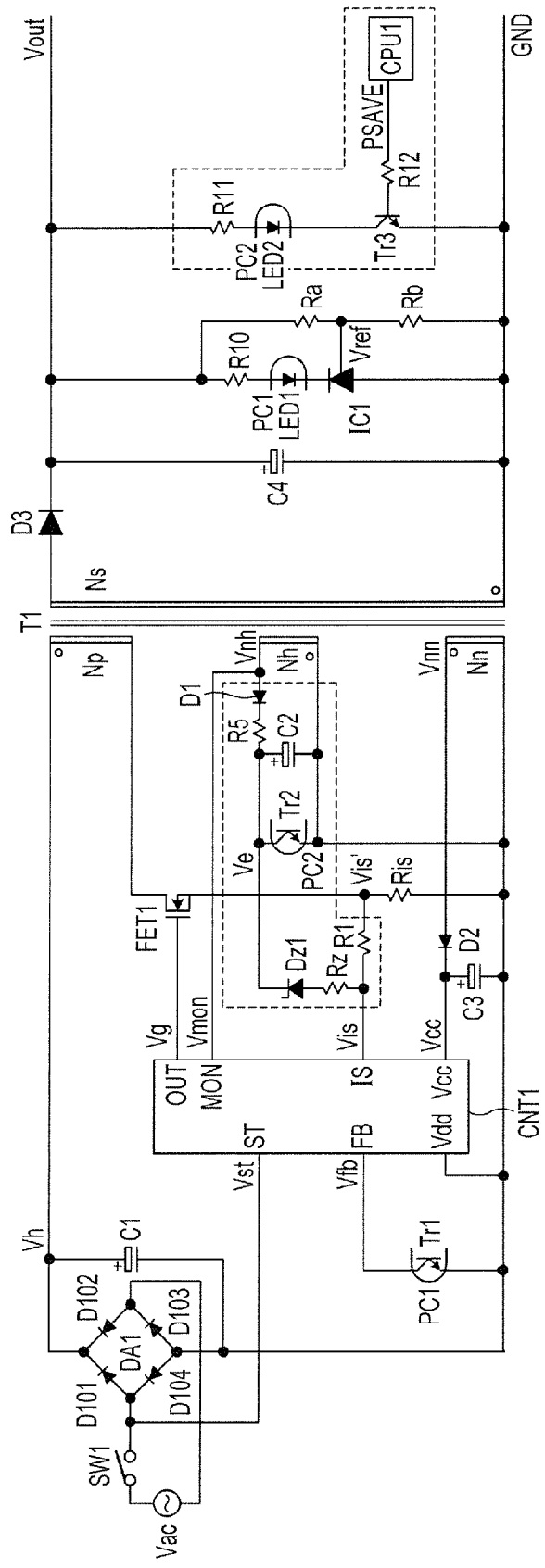
FIG. 9 is a diagram illustrating a circuit configuration of a power supply device of Embodiment 5.

FIG. 9 is a diagram illustrating a circuit configuration of a power supply device of this embodiment. In FIG. 9, parts encircled by broken lines are parts of circuitry added to the conventional power supply device illustrated in FIG. 1A. The other parts of circuitry are identical to those of FIGS. 1A and 1B. Accordingly, the same symbols are assigned to the parts, on which the description is omitted.

One of the added parts of circuitry is provided on the secondary side of the transformer T1, and the other part is provided on the primary side of the transformer. The part of circuitry added to the secondary side of the transformer T1 includes a resistor R11, a photocoupler PC2, a transistor Tr3, and a resistor R12. According to the PSAVE signal (power saving signal) output from the CPU 1, which is an control element, on and off control is performed on the transistor Tr3. An LED 2 of the photocoupler PC2 is switched to the conductive/non-conductive state according to the on/off state of the transistor Tr3. When the transistor Tr3 transitions to the on state, current flows to the LED 2 of the photocoupler PC2 through the resistor R11, and the LED 2 emits light. The on/off state of the phototransistor Tr2 of the photocoupler PC2 provided on the primary side of the transformer T1 is controlled by the LED 2 of the photocoupler PC2.

The part of circuitry added on the primary side of the transformer T1 includes a rectification circuit part, an integration circuit part, a Zener diode Dz1 (first Zener diode) as a first voltage detection unit, and a resistor voltage dividing circuit part. The rectification circuit part includes a diode D1 that rectifies the positive voltage amplitude value of the pulse voltage Vnh induced in the first auxiliary winding Nh of the power supply device illustrated in FIG. 1A. The integration circuit part includes a resistor R5 and a capacitor C2, and averages the positive pulse voltage rectified by the diode D1. When the DC voltage Ve averaged by the integration circuit part is higher than a prescribed voltage (first predetermined value), current flows through the Zener diode Dz1. When the DC voltage Ve is lower, the state is switched to the high impedance state and current does not flow. The resistor voltage dividing circuit part includes the resistors Rz and R1. When the DC voltage Ve is higher than a prescribed voltage, the input voltage into the IS terminal is corrected such that a voltage higher than a voltage generated across the opposite ends of the current detection resistor Ris is input into the IS terminal of the control module CNT1.

[Operation of Power Supply Device in Middle Load State]

Figure 10A:
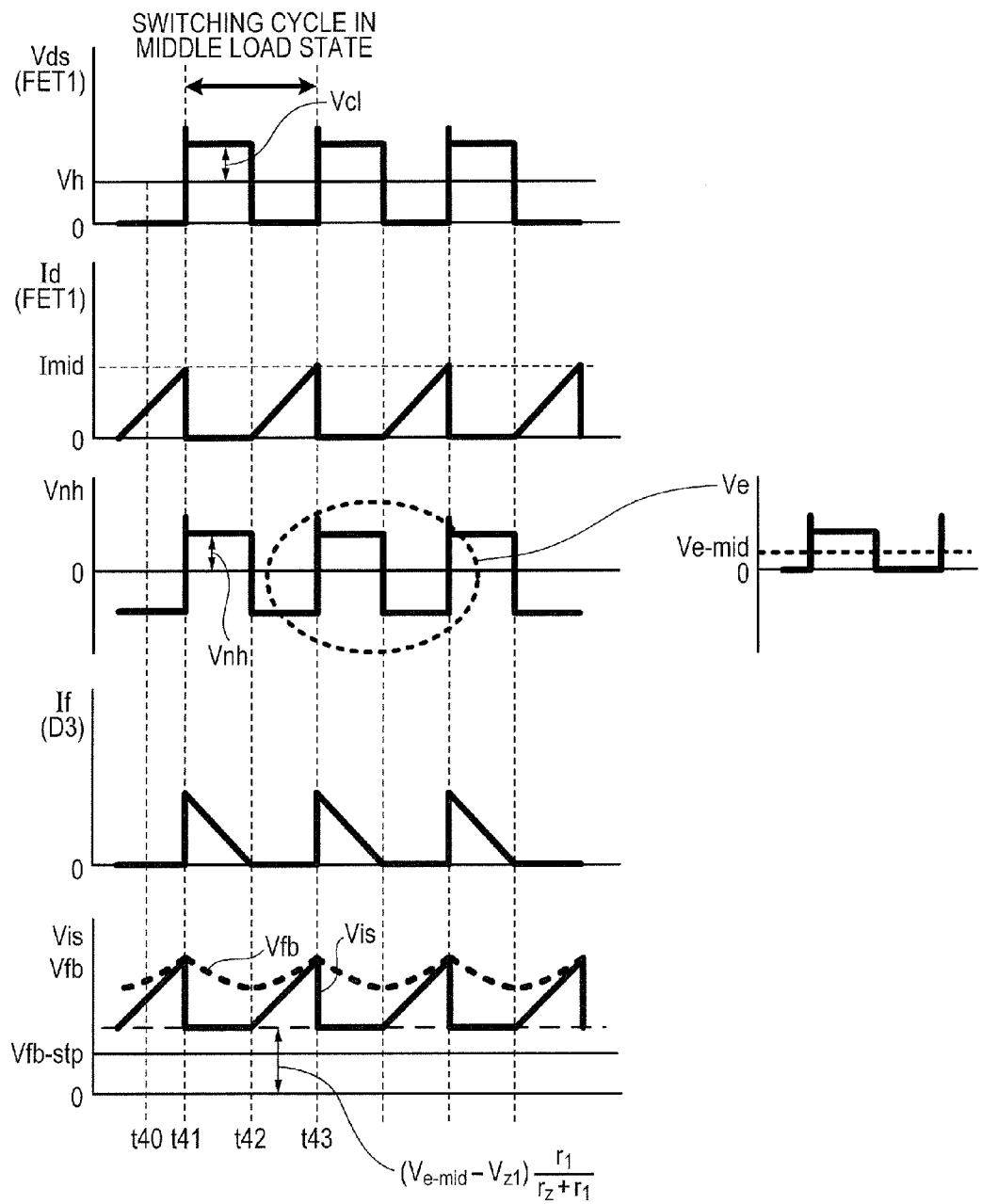
FIG. 10A is a diagram illustrating current and voltage waveforms of the power supply device of Embodiment 5 in the middle load state.

Referring to FIG. 10A, operation of the power supply device of this embodiment in the normal mode in the low load state will be described. FIG. 10A is a diagram illustrating current and voltage waveforms of the power supply device of the FIG. 9 in the middle load state. The types of the current and voltage waveforms illustrated in FIG. 10A are analogous to the types in FIG. 8B, which illustrates current and voltage waveforms of the power supply device of FIG. 1A in the middle load state. In this embodiment, the intermittent oscillation control is not performed in the middle load state, as will be described below. Timings t40 to t43 in FIG. 10A correspond to the respective timings t10 to t13 in the high load state in FIG. 8A.

In the power supply device of FIG. 9, the voltage Vnh induced in the first auxiliary winding Nh is rectified by the diode D1 and averaged by the resistor R5 and the capacitor C2 into the substantially constant DC voltage Ve. The voltage Ve is applied to the Zener diode Dz1.

Here, the DC voltage Ve in the middle load state is defined as the Ve-mid. In FIG. 10A, a waveform diagram illustrated on the right side of the waveform of the voltage Vnh induced in the first auxiliary winding Nh is a diagram illustrating a waveform of the output voltage (cathode voltage) of the diode D1 of FIG. 9. When a voltage induced in the first auxiliary winding Nh input into the anode side is a positive voltage, the diode D1 allows current to flow from the anode to the cathode. Accordingly, the positive voltage waveform is output as it is from the cathode side. In contrast, when the voltage induced in the first auxiliary winding Nh is a negative voltage, no current flows from the anode of the diode D1 to the cathode; the output voltage of the diode D1 reaches 0 accordingly. The integration circuit part including the resistor R5 and the capacitor C2 averages the positive pulse voltage rectified by the diode D1, and the DC voltage Ve-mid is thus acquired.

An after-mentioned DC voltage Ve in the low load state is defined as Ve-low. The Zener voltage Vz1 of the Zener diode Dz1 in this embodiment is selected that satisfies the following expression where the DC voltages Ve-mid and Ve-low.

$$Ve\text{-}mid > Vz1 > Ve\text{-}low \qquad (3)$$

Accordingly, a voltage (Ve-mid−Vz1) is applied to the resistor Rz connected to the anode side of the Zener diode Dz1. At this time, the Zener voltage Vz1 and the resistor values of the resistors Rz and R1 are set such that the voltage Vis acquired by dividing the voltage (Ve-mid−Vz1) applied to the resistor Rz by the resistor Rz and the resistor R1 is sufficiently higher than the voltage Vis' generated across the opposite ends of the current detection resistor Ris.

The voltage Vis input into the IS terminal, which is a current detection terminal of the control module CNT1, is substantially represented by the following expression.

$$V_{is} \cong (V_{e\text{-}mid} - V_{z1}) \times \frac{r_1}{r_z + r_1} + V'_{is} \qquad (4)$$

That is, the voltage Vis input into the IS terminal is a voltage acquired by shifting (increasing), in the positive direction, the voltage Vis' generated across the opposite ends of the current detection resistor Ris by a voltage acquired by dividing the voltage (Ve-mid−Vz1) applied to the resistor Rz by the resistor Rz and the resistor R1. The Zener voltage Vz1 and the resistor values of the resistors Rz and R1 are set such that the voltage Vis input into the IS terminal at this time is higher than the switching stop voltage Vfb−stp.

While the input voltage Vfb into the FB terminal is lower than the switching stop voltage Vfb−stp, the conventional power supply device in the middle load state performs the "intermittent oscillation control" forcedly extending the time period in which the FET 1 is in the off state. As illustrated in FIG. 10A, in this embodiment, the input voltage Vis into the IS terminal and the input voltage Vfb into the FB terminal are always higher than the switching stop voltage Vfb−stp, and the "intermittent oscillation control" is not performed. As a result, the switching frequency of the FET 1 is not in the audible frequency band, and the vibration noise of the transformer T1 is suppressed.

[Operation of Power Supply Device in Low Load State]

Subsequently, operation of the power supply device of this embodiment in the low load state will be described. In FIG. 9, in the low load state, the CPU 1 controlling the power supply device switches the PSAVE signal (power saving signal) to be output, from the previous low level to the high level in a prescribed time period, and subsequently returns the level to the low level again. While the PSAVE signal at the high level is output to the base terminal of the transistor Tr3, the transistor Tr3 is in the on state, current flows through the photocoupler PC2, and the LED 2 emits light. Accordingly, during a prescribed time period in which the PSAVE signal is at the high level, the phototransistor Tr2 of the photocoupler PC2 is in the on state. As a result, a voltage charged in the capacitor C2 included in the integration circuit is released. The charged voltage of the capacitor C2 reaches 0 volt.

Subsequently, when the PSAVE signal becomes at the low level again, the transistor Tr3 becomes in the off state, no current flows through the photocoupler PC2, and the LED 2 does not emit light. Accordingly, the phototransistor Tr2 of the photocoupler PC2 is switched to the off state. The voltage Vnh induced in the first auxiliary winding Nh is rectified and averaged by the diode D1 and the capacitor C2 into the substantially constant DC voltage Ve. Here, the DC voltage Ve in the low load state is defined as the Ve-low.

Figure 10B:
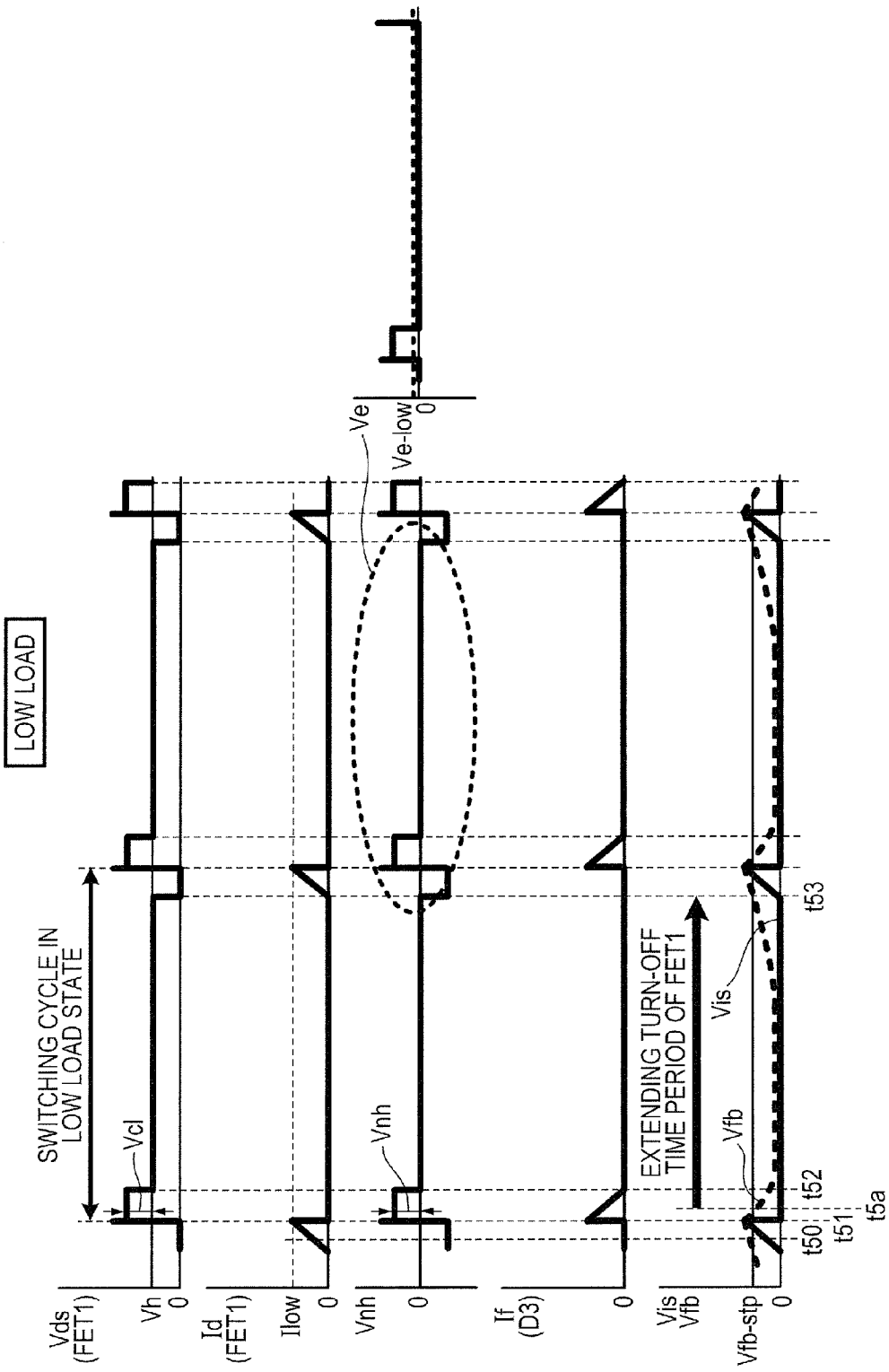
FIG. 10B is a diagram illustrating current and voltage waveforms of the power supply device of Embodiment 5 in the low load state.

FIG. 10B is a diagram illustrating current and voltage waveforms of the power supply device of FIG. 9 in the low load state. The types of the current and voltage waveforms illustrated in FIG. 10B are analogous to the types in FIG. 10A, which illustrates the current and voltage waveforms of the power supply device of FIG. 9 in the middle load state. Timings t50 to t53 in FIG. 10B correspond to the respective timings t30 to t33 in the low load state in FIG. 8C.

In FIG. 10B, a waveform diagram illustrated on the right side of the waveform of the voltage Vnh induced in the first auxiliary winding Nh is a diagram illustrating a waveform of the output voltage (cathode voltage) of the diode D1 in FIG. 9. As described above, when a voltage induced in the first auxiliary winding Nh is a positive voltage, the diode D1 outputs the positive voltage waveform as it is. When the voltage induced in the first auxiliary winding Nh is negative, the output voltage of the diode D1 is 0. The positive pulse voltage rectified by the diode D1 is averaged by the integration circuit part including the resistor R5 and the capacitor C2, and the DC voltage Ve-low is thus acquired. That is, in FIG. 10B, the voltage Vnh induced in the first auxiliary winding Nh is rectified and smoothed by the diode D1 and the capacitor C2 into the substantially constant DC voltage Ve-low, which is applied to the Zener diode Dz1.

According to the above-described Expression (3), the Zener voltage Vz1 of the Zener diode Dz1 is set to the (voltage) value higher than the DC voltage Ve-low in the low load state. Accordingly, the Zener diode Dz1 is in the high impedance state. As a result, no current flows through the resistor Rz. The input voltage Vis into the IS terminal and the voltage Vis' generated across the opposite ends of the current detection resistor Ris have a substantially same voltage value. That is, in the low load state, the resistors Rz and R1 do not affect the input voltage Vis into the IS terminal. Accordingly, as described above, the switching frequency of the FET 1 flow in the low load state sufficiently decreases, which can reduce the power loss due to switching of the FET 1 and, in turn, reduce the power consumption of the apparatus.

As described above, this embodiment can reduce start-up power consumption, which is power consumption in the low load state, while suppressing the vibration noise of the transformer in the middle load state. In the middle load state, the vibration noise of the transformer is reduced by setting the switching frequency out of the audible frequency band. Furthermore, in the low load state, the switching frequency is reduced, which can reduce the power loss due to switching of the switching element and, in turn, reduce the start-up power consumption of the apparatus.

Embodiment 6

In Embodiment 5, a circuit configuration has been described that corrects voltage Vis' such that the input voltage Vis of the IS terminal of the control module CNT1 and the input voltage Vfb of the FB terminal are higher than the switching stop voltage Vfb−stp, even when the load is the middle load. However, in the circuit configuration described in Embodiment 5, the voltage is corrected not only in the middle load state but also in the high load state. Accordingly, the switching frequency sometimes increases more than necessary to increase the power loss due to switching of the switching element. Thus, in this embodiment, a circuit configuration will be described later that suppresses increase in switching frequency in the high load state.

[Overview of Power Supply Device of this Embodiment]

Figure 11:
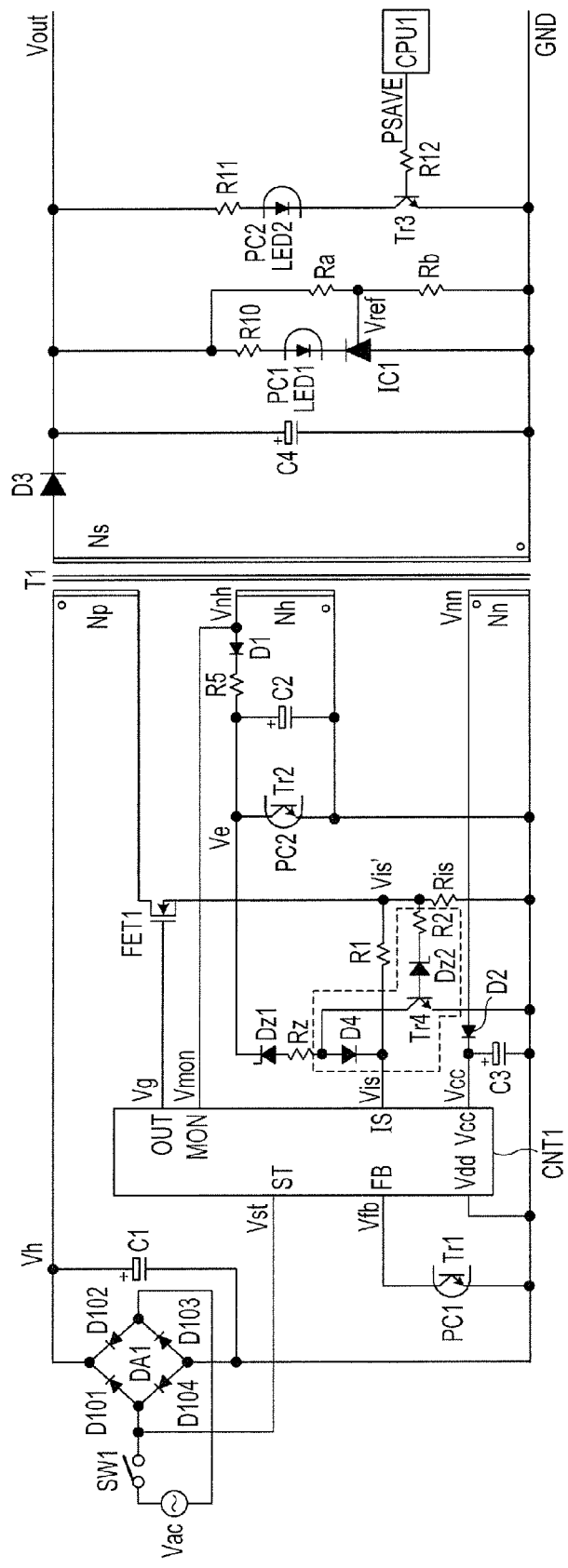
FIG. 11 is a diagram illustrating a circuit configuration of a power supply device of Embodiment 6.

FIG. 11 is a diagram illustrating a circuit configuration of a power supply device of this embodiment. In FIG. 11, a part encircled by a broken line is a part of circuitry added to the power supply device illustrated in FIG. 9 of Embodiment 5. The other parts of circuitry are identical to those in FIG. 9. Accordingly, the same symbols are assigned to the parts, on which the description is omitted. The added part of circuitry includes a Zener diode Dz2 as a second voltage detection unit, a resistor R2, a diode D4, and a transistor Tr4. When the load is the middle load, the resistor voltage dividing circuit described in Embodiment 5 operates. When the load is high, the resistor voltage dividing circuit does not operate. That is, when the voltage generated across the opposite ends of the current detection resistor Ris is higher than the Zener voltage Vz2 (second predetermined value) of the Zener diode Dz2, the transistor Tr4 is in the on state, the diode D4 is in the non-conductive state, and the resistor voltage dividing circuit does not function (does not operate). In contrast, when the voltage generated across the opposite ends of the current detection resistor Ris is lower than the Zener voltage Vz2 of the Zener diode Dz2, the transistor Tr4 is in the off state, the diode D4 is in the conductive state, and the resistor voltage dividing circuit functions (operates).

[Operation of Power Supply Device in Middle Load State and High Load State]

To simplify the description in this embodiment, the forward direction voltage drop Vfd4 of the diode D4 and the base-emitter voltage Vbe of the transistor Tr4 are set to 0. The Zener voltage Vz2 of the Zener diode Dz2 (second Zener diode) is a threshold voltage for setting the transistor Tr4 to the on state. In this embodiment, a Zener voltage Vz2 is selected that is higher than the voltage Vis' generated across the opposite ends of the current detection resistor Ris in the middle load state, and lower than the voltage Vis' in the high load state. Accordingly, in the middle load state, the Zener diode Dz2 is in the non-conductive state, and the transistor Tr4 is in the off state. As a result, the diode D4 is in the conductive state, and the voltage Vis corrected by the resistor voltage dividing circuit including the resistors Rz and R1 is input into the IS terminal.

In contrast, in the high load state, the Zener diode Dz2 is in the conductive state, and the transistor Tr4 is in the on state, the input voltage on the anode side of the diode D4 is substantially 0 volt. When the voltage Vis' across the opposite ends of the current detection resistor Ris increases, the diode D4 is reverse biased, the resistor voltage dividing circuit including the resistors Rz and R1 does not operate, and the voltage Vis' across the opposite ends of the current detection resistor Ris is input as the input voltage Vis of the IS terminal. Accordingly, in the high load state, increase in switching frequency of the FET 1 can be suppressed.

As described above, this embodiment can reduce start-up power consumption, which is power consumption in the low load state, while suppressing the vibration noise of the transformer in the middle load state. In the middle load state, the vibration noise of the transformer can be reduced by setting the switching frequency out of the audible frequency band. Furthermore, in the high load state, the switching frequency does not increase more than necessary. Accordingly, switching of the switching element does not increase the power loss.

Embodiment 7

In Embodiment 6, the description has been made where the forward direction voltage drop of the diode and the base-emitter voltage of the transistor are 0 volt. However, in an actual circuit, these voltages may affect the voltage correction operation in the circuit. Thus, in this embodiment, a circuit configuration that is in consideration with the forward direction voltage drop of the diode and the base-emitter voltage of the transistor will be described.

Figure 12A:
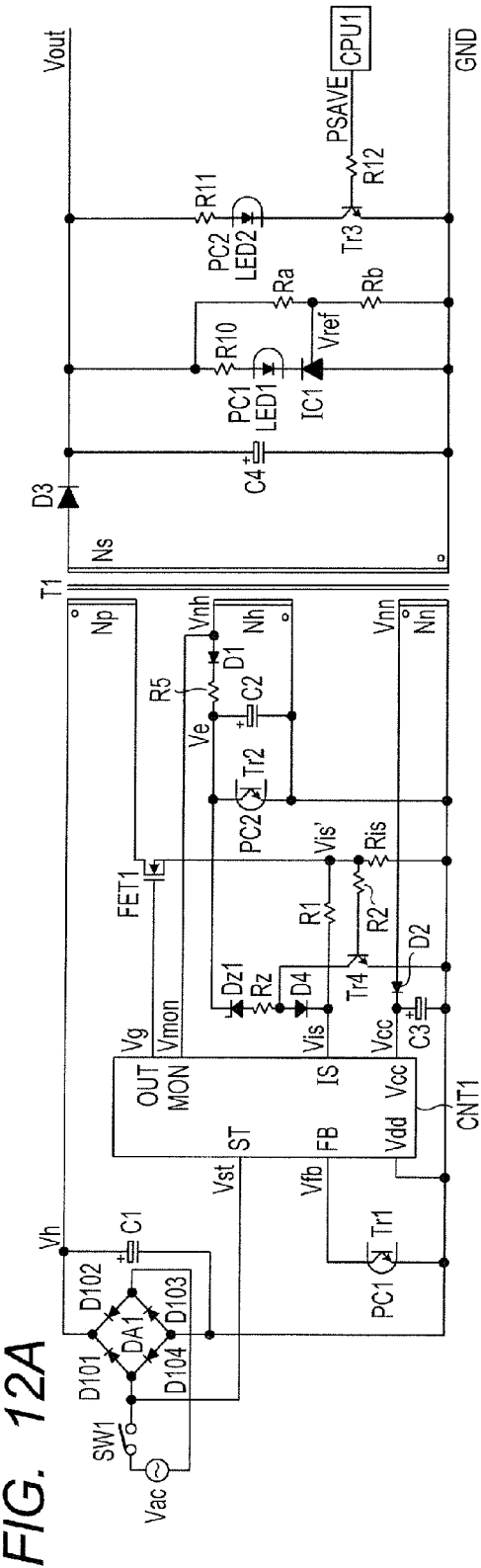
FIGS. 12A and 12B are diagrams illustrating circuit configurations of a power supply device of Embodiment 7.

FIG. 12A is a circuit configuration in consideration of the base-emitter voltage of the transistor. In comparison with FIG. 11 in Embodiment 6, the Zener diode Dz2 connected to the base terminal of the transistor T4 is omitted. The other parts of circuitry are analogous to those in FIG. 11. Accordingly, the same symbols are assigned, and the description thereof is omitted. In Embodiment 6, the description has been made where the base-emitter voltage Vbe of the transistor Tr4 is 0 volt. Instead, in this embodiment, as illustrated in FIG. 12A, the base-emitter voltage Vbe of the transistor Tr4 (typically 0.6 to 0.7 V) is used as a threshold voltage for setting the transistor Tr4 to the on state. Accordingly, even with the configuration without the Zener diode Dz2, advantageous effects equivalent to those of Embodiment 6 can be exerted. Furthermore, the Zener diode Dz2 necessary in Embodiment 6 can be omitted, which can reduce the cost.

Figure 12B:
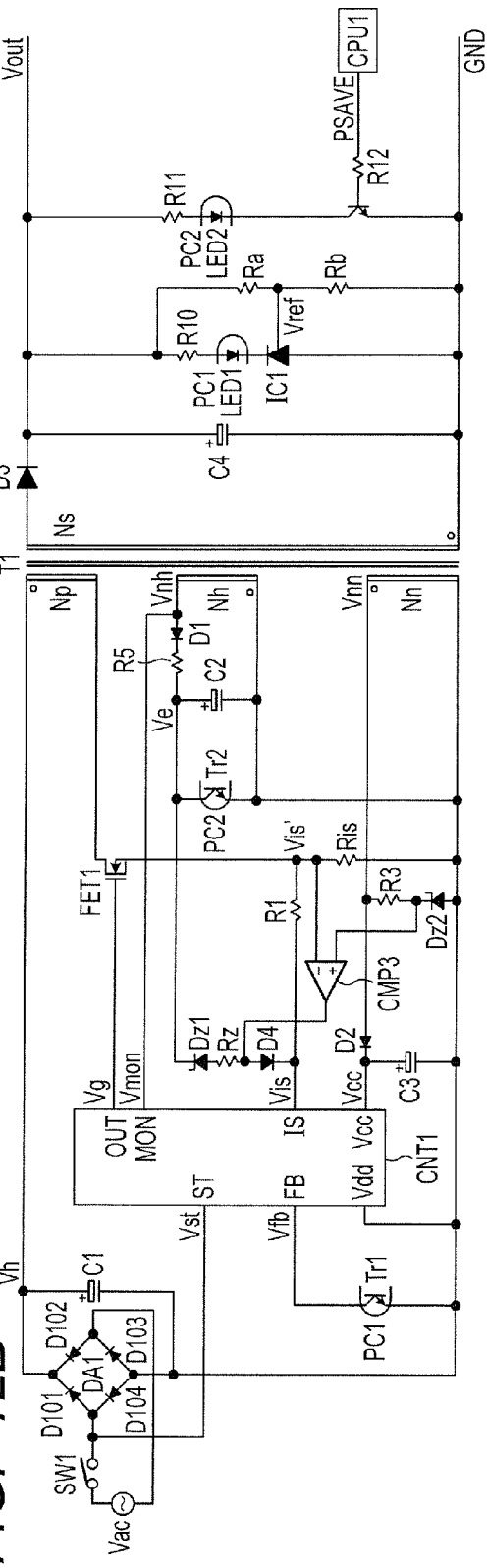

In Embodiment 6, the description has been made where the forward direction voltage drop Vfd4 of the diode D4 and the base-emitter voltage Vbe of the transistor Tr4 are 0 volt. However, in an actual circuit, the forward direction voltage drop Vfd4 and the base-emitter voltage Vbe may affect correction operation of the circuit. Thus, FIG. 12B is a circuit diagram illustrating a circuit configuration where the transistor Tr4 in the circuit in FIG. 11 in Embodiment 6 is replaced with a circuit including the comparator CMP3. The other parts of circuitry are analogous to those in FIG. 9. Accordingly, the same symbols are assigned thereto, and the description thereof is omitted.

In FIG. 12B, the voltage Vis' generated across the opposite ends of the current detection resistor Ris is input into the reverse input terminal (−) of the comparator CMP3. Meanwhile, a cathode side of the Zener diode Dz2 (third Zener diode) is connected to a non-reverse input terminal (+), where the Zener voltage Vz2 is applied. Furthermore, the cathode side of the Zener diode Dz2 is also connected to a pull-up resistor R3.

In the case where the voltage Vis', which is an input voltage into the reverse input terminal (−), is lower than the Zener voltage Vz2 applied to the non-reverse input terminal (+), i.e., in the middle load state, the output of the comparator CMP3 is in the high impedance state. As a result, the diode D4 is in the conductive state, and a voltage corrected by the resistor voltage dividing circuit including the resistors Rz and R1 is input as the input voltage Vis of the IS terminal. In contrast, in the case where the voltage Vis', which is an input voltage into the reverse input terminal (−), is higher than the Zener voltage Vz2 applied to the non-reverse input terminal (+), i.e., in the high load state, current flowing through the Zener diode Dz1 and the resistor Rz flows into the comparator CMP3. As a result, the input voltage on the anode side of the diode D4 reaches substantially 0 volt, the resistor voltage dividing circuit including the resistors Rz and R1 does not operate, and the voltage Vis' across the opposite ends of the current detection resistor Ris is input into the input voltage Vis of the IS terminal. As illustrated in FIG. 12B, adoption of the comparator CMP3 instead of the transistor Tr4 can prevent the base-emitter voltage Vbe of the transistor Tr4 from affecting correction operation by the resistor voltage dividing circuit.

As described above, this embodiment can reduce start-up power consumption, which is power consumption in the low load state, while suppressing the vibration noise of the transformer in the middle load state. In the middle load state, the vibration noise of the transformer is reduced by setting the switching frequency out of the audible frequency band. Furthermore, the circuit element (Zener diode) is omitted, thereby allowing the cost to be reduced. Moreover, adoption of the comparator instead of the transistor can facilitate stabilization of circuit operation.

Embodiment 8

The power supply device described in Embodiments 5 to 7 can be applied as, for instance, a low voltage power supply for an image forming apparatus, i.e., a power supply that supplies power to a controller (control unit) and a driver, such as a motor. A configuration of an image forming apparatus to which any of the power supply devices of Embodiments 5 to 7 is applied will hereinafter be described.

[Configuration of Image Forming Apparatus]

The configuration of the laser beam printer, which is an example of the image forming apparatus, is analogous to the configuration in FIG. 7. Accordingly, the description thereof is omitted. The laser beam printer 300 includes a controller, not illustrated, that controls the image forming operation by the image forming unit and the sheet transfer operation. The power supply device 400 described in each of Embodiments 5 to 7 supplies power to, for instance, the controller. Furthermore, the power supply device 400 described in each of Embodiments 5 to 7 supplies power to drivers, such as motors, for rotating the photosensitive drum 311 or for driving various rollers conveying a sheet. In the standby state (e.g., in the low load state) for achieving power conservation, the image forming apparatus of this embodiment reduces the load, for instance, supplies power only to the controller, thereby allowing the power consumption to be reduced. That is, in the image forming apparatus of this embodiment, the power supply device 400 described in each of Embodiments 5 to 7 performs intermittent oscillation operation in the low load state. When the load on the image forming apparatus is the middle load, the configurations described in Embodiments 5 to 7 increase the switching frequency of the power supply device 400, thereby setting vibration noise occurring from the transformer T1 to be out of the audible frequency band. Accordingly, the vibration noise of the transformer is suppressed so as to be inaudible to humans, and the power consumption of the power supply device 400 is reduced.

As described above, this embodiment can reduce standby power consumption, which is power consumption in the low load state, while suppressing the vibration noise of the transformer in the middle load state.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-192103, filed Aug. 31, 2012, and Japanese Patent Application No. 2012-192105, filed Aug. 31, 2012, which are hereby incorporated by reference herein in their entirety.

What is claimed is:

1. A power supply device comprising:
a transformer having a primary winding and an auxiliary winding on a primary side of the transformer and a secondary winding on a secondary side of the transformer, the auxiliary winding having a winding direction different from a winding direction of the primary winding;
a switching unit that switches current flowing to the primary winding;
a detection unit that detects current flowing through the primary winding, and outputs a first voltage according to the current;
a secondary side voltage detection unit configured to output a second voltage according to an output voltage output from the secondary winding;
a control unit that controls switching operation of the switching unit according to the first voltage and the second voltage, wherein the control unit is configured to be switchable between a normal mode in which the switching unit is switched at a first frequency and a power saving mode in which the switching unit is switched at a second frequency lower than the first frequency; and
a correction unit that corrects the first voltage output by the detection unit in a case where an auxiliary winding voltage that is induced in the auxiliary winding is higher than a first predetermined value and that does not correct the first voltage in a case where a voltage induced in the auxiliary winding is less than the first voltage,
wherein, in the normal mode, the correction unit corrects the first voltage output from the detection unit and the control unit controls the switching unit according to the corrected first voltage output by the correction unit and the second voltage, and
wherein, in the power saving mode, the control unit controls the switching unit at the second frequency according to the first voltage output from the detection unit and not corrected by the correction unit and the second voltage.

2. A device according to claim 1, wherein the correction unit includes a plurality of resistors, corrects the voltage output from the detection unit using a voltage acquired by dividing the voltage induced in the auxiliary winding by the plurality of resistors, and outputs the corrected voltage to the control unit.

3. A device according to claim 2,
wherein the correction unit includes a Zener diode, and the first predetermined value is a Zener voltage of the Zener diode.

4. A device according to claim 1, further comprising
a second detection unit that detects the first voltage output from the detection unit,
wherein in a case where a voltage detected by the second detection unit is higher than a second predetermined value, the correction unit corrects the first voltage output from the detection unit, and in a case where a voltage detected by the second detection unit is less than the second predetermined value, the correction unit does not correct the first voltage output from the detection unit.

5. A device according to claim 4,
wherein the second detection unit comprises a Zener diode whose anode side is connected to a transistor and a base terminal of the transistor, and
the second predetermined value is a Zener voltage of the Zener diode.

6. A device according to claim 4,
wherein the second detection unit comprises a transistor, and
the second predetermined value is a base-emitter voltage of the transistor.

7. A device according to claim 4,
wherein the second detection unit comprises a comparator, and
the second predetermined value is a Zener voltage of a Zener diode connected to an input terminal of the comparator.

8. A device according to claim 1, wherein the detection unit is a resistor that converts current flowing through the primary winding into a voltage.

9. A device according to claim 1, further comprising
a rectification unit that rectifies and smoothes a voltage induced in the auxiliary winding having a winding direction different from a winding direction of the primary winding of the transformer,
wherein the voltage output from the rectification unit is input to the correction unit.

10. A device according to claim 9, wherein the rectification unit comprises:
- a diode that rectifies the voltage induced in the auxiliary winding; and
- a capacitor that smoothes the rectified voltage.

11. An image forming apparatus forming an image on a recording medium, comprising:
- an image forming unit; and
- a power supply that supplies power to the image forming apparatus, the power supply comprising:
- a transformer that comprises a primary winding and an auxiliary winding on a primary side of the transformer and a secondary winding on a secondary side of the transformer, the auxiliary winding having a winding direction different from a winding direction of a primary winding;
- a switching unit that switches current flowing to the primary winding;
- a detection unit that detects current flowing through the primary winding, and outputs a first voltage according to the current;
- a secondary side voltage detection unit configured to output a second voltage according to an output voltage output from the secondary winding;
- a control unit that controls switching operation of the switching unit, according to the first voltage and the second voltage, wherein the control unit is configured to be switchable between a normal mode in which the switching unit is switched at a first frequency and a power saving mode in which the switching unit is switched at a second frequency lower than the first frequency; and
- a correction unit that corrects the first voltage output by the detection unit when an auxiliary winding voltage that is induced in the auxiliary winding is higher than a first predetermined value and that does not correct the first voltage in a case where a voltage that is induced in the auxiliary winding is less than the first voltage,
- wherein in the normal mode, the correction unit corrects the first voltage output from the detection unit, and the control unit controls the switching unit according to the corrected first voltage output by the correction unit and the second voltage, and
- wherein in the power saving mode, the control unit controls the switching unit at the second frequency according to the first voltage output from the detection unit and not corrected by the correction unit and the second voltage.

12. A apparatus according to claim 11, further comprising a controller that controls the image forming unit,
wherein the power supply supplies power to the controller.

* * * * *